(12) United States Patent
Cahill

(10) Patent No.: US 10,662,975 B2
(45) Date of Patent: May 26, 2020

(54) FAN BLADE SURFACE FEATURES

(71) Applicant: Horton, Inc., Roseville, MN (US)

(72) Inventor: Kevin Cahill, Fishers, IN (US)

(73) Assignee: Horton, Inc., Roseville, MN (US)

( * ) Notice: Subject to any disclaimer, the term of this patent is extended or adjusted under 35 U.S.C. 154(b) by 204 days.

(21) Appl. No.: 15/708,833

(22) Filed: Sep. 19, 2017

(65) Prior Publication Data

US 2018/0030996 A1 Feb. 1, 2018

Related U.S. Application Data

(63) Continuation of application No. PCT/US2016/026359, filed on Apr. 7, 2016.
(Continued)

(51) Int. Cl.
*F04D 29/66* (2006.01)
*F04D 29/38* (2006.01)
(Continued)

(52) U.S. Cl.
CPC .............. *F04D 29/667* (2013.01); *F01P 5/02* (2013.01); *F04D 25/08* (2013.01); *F04D 29/38* (2013.01);
(Continued)

(58) Field of Classification Search
CPC ...... F04D 29/667; F04D 29/388; F04D 29/38; F04D 25/08; F04D 29/384; F04D 29/681;
(Continued)

(56) References Cited

U.S. PATENT DOCUMENTS

| 33,077 A | 8/1861 | Harrison |
|---|---|---|
| 675,477 A | 6/1901 | Hall |

(Continued)

FOREIGN PATENT DOCUMENTS

| CN | 1088667 A | 6/1994 |
|---|---|---|
| CN | 1249408 A | 4/2000 |

(Continued)

OTHER PUBLICATIONS

Chinese Search Report dated Jan. 17, 2019, for corresponding Chinese Application No. 2016800185946.
(Continued)

*Primary Examiner* — Jacob M Amick
*Assistant Examiner* — Charles Brauch
(74) *Attorney, Agent, or Firm* — Westman, Champlin & Koehler, P.A.

(57) ABSTRACT

A fan blade (134) includes a working region (148) having a leading edge (138) and a pressure side (136). A plurality of flow modification features (150-1 to 150-4) are positioned at the working region, including first and second flow modification features (150-1, 150-2, 150-3) each having a wedge shape with a pointed end (152) and a wider end (154), and located on the pressure side. A length of the first flow modification feature is less than a chord length of the fan blade, and the pointed end of the first flow modification feature is spaced from the leading edge. A length of the second flow modification feature is less than the chord length of the fan blade, and the pointed end of the second flow modification feature is spaced from the leading edge. The first and second flow modification features are spaced from each other to define a channel (156) therebetween.

25 Claims, 16 Drawing Sheets

Related U.S. Application Data

(60) Provisional application No. 62/210,166, filed on Aug. 26, 2015, provisional application No. 62/144,681, filed on Apr. 8, 2015.

(51) Int. Cl.
- *F04D 29/68* (2006.01)
- *F01P 5/02* (2006.01)
- *F04D 25/08* (2006.01)
- *F04D 29/34* (2006.01)

(52) U.S. Cl.
CPC ......... *F04D 29/384* (2013.01); *F04D 29/388* (2013.01); *F04D 29/681* (2013.01); *F04D 29/34* (2013.01); *F05D 2240/303* (2013.01); *F05D 2240/305* (2013.01); *F05D 2240/306* (2013.01); *F05D 2240/307* (2013.01); *F05D 2250/71* (2013.01); *F05D 2260/961* (2013.01)

(58) Field of Classification Search
CPC ...... F04D 29/34; F04D 29/666; F04D 29/663; F01P 5/02; F05D 2240/303; F05D 2260/961; F05D 2240/307; F05D 2250/71; F05D 2240/306; F05D 2240/305
See application file for complete search history.

(56) References Cited

U.S. PATENT DOCUMENTS

| | | |
|---|---|---|
| 1,022,203 A | 4/1912 | Nettle |
| 1,041,913 A | 10/1912 | Tyson |
| 1,066,988 A | 7/1913 | Boutwell |
| 1,244,786 A | 12/1916 | Seymour |
| 1,515,268 A | 11/1924 | Morrow |
| 1,834,888 A | 12/1931 | Baughn |
| 1,853,607 A | 4/1932 | Barker |
| 2,014,032 A | 9/1935 | Sharpe et al. |
| 2,253,066 A | 8/1941 | Dowell |
| 2,361,676 A | 10/1944 | Baker |
| 2,650,752 A | 9/1953 | Hoadley |
| 2,731,193 A | 1/1956 | Lall et al. |
| 2,869,334 A | 1/1959 | Atchison |
| 3,193,185 A | 7/1965 | Erwin et al. |
| 3,298,677 A | 1/1967 | Anderson |
| 3,406,760 A | 10/1968 | Weir |
| 3,706,512 A | 12/1972 | Strelshik |
| 3,728,043 A | 4/1973 | Pratinidhi |
| 3,740,006 A | 6/1973 | Maher |
| 3,822,103 A * | 7/1974 | Hori ............... F04D 29/382 416/132 R |
| 3,885,888 A | 5/1975 | Warhol |
| 4,028,005 A | 6/1977 | Eck |
| 4,128,363 A | 12/1978 | Fujikake et al. |
| 4,172,691 A | 10/1979 | Comstock et al. |
| 4,174,924 A | 11/1979 | Smithson, Jr. |
| 4,189,281 A | 2/1980 | Katagiri et al. |
| 4,222,710 A | 9/1980 | Katagiri et al. |
| 4,265,596 A | 5/1981 | Katagiri et al. |
| 4,664,593 A | 5/1987 | Hayashi et al. |
| 4,671,473 A | 6/1987 | Goodson |
| 4,688,472 A | 8/1987 | Inglis |
| 4,712,980 A | 12/1987 | Gely et al. |
| 4,720,239 A | 1/1988 | Owczarek |
| 4,746,271 A | 5/1988 | Wright |
| 5,193,983 A | 3/1993 | Shyu |
| 5,215,441 A | 6/1993 | Evans et al. |
| 5,231,947 A | 8/1993 | Kasahara et al. |
| 5,244,349 A | 8/1993 | Wang |
| 5,295,789 A | 3/1994 | Daguet |
| 5,312,228 A | 5/1994 | De Jong et al. |
| 5,437,541 A | 8/1995 | Vainrub |
| 5,542,630 A | 8/1996 | Savill |
| 5,971,709 A | 10/1999 | Hauser |
| 5,997,251 A | 12/1999 | Lee |
| 6,059,530 A | 5/2000 | Lee |
| 6,065,936 A | 5/2000 | Shingai et al. |
| 6,142,738 A | 11/2000 | Toulmay |
| 6,183,197 B1 | 2/2001 | Bunker et al. |
| 6,206,636 B1 | 3/2001 | Powers |
| 6,296,446 B1 | 10/2001 | Ishijima et al. |
| 6,375,427 B1 | 4/2002 | Williams et al. |
| 6,382,915 B1 | 5/2002 | Aschermann et al. |
| 6,394,397 B1 | 5/2002 | Ngo et al. |
| 6,538,887 B2 | 3/2003 | Belady et al. |
| 6,554,575 B2 | 4/2003 | Leeke et al. |
| 6,726,454 B2 | 4/2004 | Blass et al. |
| 6,779,979 B1 | 8/2004 | Wadia et al. |
| 6,790,005 B2 | 9/2004 | Lee et al. |
| 6,837,687 B2 | 1/2005 | Lee et al. |
| 6,976,826 B2 | 12/2005 | Roy et al. |
| 7,118,342 B2 | 10/2006 | Lee et al. |
| 7,270,519 B2 | 9/2007 | Wadia et al. |
| 7,331,764 B1 | 2/2008 | Reynolds |
| 7,371,048 B2 | 5/2008 | Downs et al. |
| 8,083,484 B2 | 12/2011 | Hatman |
| 8,100,664 B2 | 1/2012 | Hwang et al. |
| 8,186,965 B2 | 5/2012 | Kuhne et al. |
| 8,240,996 B2 | 8/2012 | Surls |
| 8,414,265 B2 | 4/2013 | Willett, Jr. |
| 8,491,270 B2 | 7/2013 | Eguchi et al. |
| 8,500,396 B2 | 8/2013 | Klasing et al. |
| 8,512,003 B2 | 8/2013 | Klasing et al. |
| 8,550,782 B2 | 10/2013 | Hoskins |
| 8,568,095 B2 | 10/2013 | Bushnell |
| 8,591,195 B2 | 11/2013 | Di Florio et al. |
| 8,632,031 B2 | 1/2014 | Shmilovich et al. |
| 8,632,311 B2 | 1/2014 | Klasing et al. |
| 8,690,536 B2 | 4/2014 | Beeck et al. |
| 8,746,053 B2 | 6/2014 | Brake et al. |
| 8,783,624 B2 | 7/2014 | Koppelman et al. |
| 8,845,280 B2 | 9/2014 | Diamond et al. |
| 8,870,124 B2 | 10/2014 | Ireland |
| 8,888,453 B2 | 11/2014 | Fuglsang et al. |
| 9,039,381 B2 | 5/2015 | Grife et al. |
| 9,046,090 B2 | 6/2015 | Kao et al. |
| 9,046,110 B2 | 6/2015 | Teraoka et al. |
| 2003/0012653 A1 | 1/2003 | Diemunsch |
| 2003/0108423 A1 | 6/2003 | Morgan et al. |
| 2004/0091361 A1 | 5/2004 | Wadia et al. |
| 2004/0161338 A1 | 8/2004 | Hsieh |
| 2006/0286924 A1 | 12/2006 | Milana |
| 2007/0031257 A1 | 2/2007 | Suzuki et al. |
| 2008/0156282 A1 | 7/2008 | Aschermann |
| 2009/0214355 A1 | 8/2009 | Pereti et al. |
| 2009/0324413 A1 | 12/2009 | Streng et al. |
| 2010/0266428 A1* | 10/2010 | Nakagawa ............ F04D 29/164 417/321 |
| 2012/0031591 A1 | 2/2012 | Eguchi et al. |
| 2012/0269623 A1 | 10/2012 | Milne |
| 2012/0288633 A1* | 11/2012 | Zhang .................... B32B 33/00 427/385.5 |
| 2013/0170977 A1 | 7/2013 | Bielek |
| 2013/0209233 A1 | 8/2013 | Xu et al. |
| 2013/0209242 A1 | 8/2013 | Ota et al. |
| 2013/0230379 A1 | 9/2013 | Ali |
| 2013/0287581 A1 | 10/2013 | Aschermann et al. |
| 2014/0003933 A1 | 1/2014 | Inada et al. |
| 2014/0010650 A1 | 1/2014 | Zelesky et al. |
| 2014/0044552 A1 | 2/2014 | Smyth et al. |
| 2014/0091180 A1 | 4/2014 | Shmilovich et al. |
| 2014/0096500 A1 | 4/2014 | Chengappa et al. |
| 2014/0147282 A1 | 5/2014 | Hu et al. |
| 2014/0186190 A1 | 7/2014 | Zelesky et al. |
| 2014/0219772 A1 | 8/2014 | Nordeen et al. |
| 2014/0219811 A1 | 8/2014 | Lee |
| 2014/0241899 A1 | 8/2014 | Marini et al. |
| 2014/0255200 A1 | 9/2014 | Guo et al. |
| 2014/0286786 A1 | 9/2014 | Ragg et al. |
| 2014/0294595 A1 | 10/2014 | Carroll et al. |
| 2015/0361808 A1 | 12/2015 | Botrel et al. |

(56) References Cited

U.S. PATENT DOCUMENTS

| | | | |
|---|---|---|---|
| 2017/0184125 A1 | 6/2017 | Matsui et al. | |
| 2017/0261000 A1 | 9/2017 | Komura et al. | |

FOREIGN PATENT DOCUMENTS

| | | | | |
|---|---|---|---|---|
| CN | 1590778 | A | 3/2005 | |
| CN | 1908445 | A | 2/2007 | |
| CN | 102656370 | A | 9/2012 | |
| CN | 103362868 | A | 10/2013 | |
| DE | 19706668 | A1 | 9/1998 | |
| DE | 102005030444 | A1 * | 2/2006 | F04D 29/384 |
| DE | 102005030444 | A1 | 2/2006 | |
| DE | 102015200361 | A1 | 6/2016 | |
| EP | 515839 | B1 | 1/1996 | |
| EP | 1371813 | A1 | 12/2003 | |
| EP | 1851443 | B1 | 11/2007 | |
| FR | 1069279 | A | 7/1954 | |
| GB | 2041103 | B | 5/1983 | |
| JP | S51-138705 | U | 11/1976 | |
| JP | S59105998 | A | 6/1984 | |
| JP | 3294699 | A | 12/1991 | |
| JP | H05215098 | A | 8/1993 | |
| JP | 5332294 | A | 12/1993 | |
| JP | 5340392 | A | 12/1993 | |
| JP | H05340389 | A | 12/1993 | |
| JP | 7259795 | A | 10/1995 | |
| JP | H08-170599 | A | 7/1996 | |
| JP | 8240197 | A | 9/1996 | |
| JP | 2003106295 | A | 4/2003 | |
| JP | 03468529 | B2 | 11/2003 | |
| JP | 3861266 | B2 | 12/2006 | |
| JP | 2008184999 | A | 8/2008 | |
| JP | 4321690 | B2 | 8/2009 | |
| JP | 2013-253525 | A | 12/2013 | |
| RU | 2206798 | C2 | 6/2003 | |
| WO | 1991001247 | A1 | 2/1991 | |
| WO | 1997033091 | A1 | 9/1997 | |
| WO | 2010000263 | A2 | 1/2010 | |
| WO | 2010000263 | A3 | 7/2010 | |
| WO | 2011097024 | A1 | 8/2011 | |
| WO | 2012028890 | A1 | 3/2012 | |
| WO | 2012072779 | A1 | 6/2012 | |
| WO | 2012082667 | A2 | 6/2012 | |
| WO | 2012082667 | A3 | 2/2013 | |
| WO | 2013020959 | A1 | 2/2013 | |
| WO | 2014064195 | A1 | 5/2014 | |
| WO | 2014114988 | A1 | 7/2014 | |
| WO | 2014158285 | A2 | 10/2014 | |
| WO | 2015016704 | A1 | 2/2015 | |
| WO | 2015073149 | A1 | 5/2015 | |
| WO | 2015171446 | A1 | 11/2015 | |
| WO | 2016026814 | A1 | 2/2016 | |

OTHER PUBLICATIONS

Chinese Office Action dated Jan. 17, 2019, for corresponding Chinese Application No. 2016800185946.

Extended European Search Report dated Nov. 15, 2018, in corresponding European application No. 16777247.4.

International Search Report and Written Opinion of the International Search Authority dated Jul. 19, 2016, for corresponding International Application PCT/US2016/026359, filed Apr. 7, 2016.

Newegg "Noctua NF-A14 PWM 140mm Case Fan" web page; https://www.newegg.com/Product/Product.aspx?item= N82E16835608044 (Accessed Online Mar. 30, 2016), 5 pages.

Newegg "Noctua NF-A14 PWM 140mm Case Fan " web page; https://web.archive.org/web/20150113013024/https://www.newegg. com/Product/Product.aspx?Item=N82E16835608044 (Archived Jan. 13, 2015), 2 pages.

Extended European Search Report dated Jun. 12, 2018, issued for corresponding European Application No. 18157191, filed Feb. 16, 2018.

Office Action dated Mar. 18, 2020 in corresponding Japanese patent application No. 2017-552903.

* cited by examiner

FAN BLADE SURFACE FEATURES

CROSS-REFERENCE TO RELATED APPLICATIONS

This Application is a Continuation of International Application No. PCT/US2016/026359, filed Apr. 7, 2016 and published as WO/2016/164533 on Oct. 13, 2016, in English, the contents of which is hereby incorporated by reference in its entirety. This application further claims priority to U.S. Provisional Patent Applications Ser. Nos. 62/144,681 (filed Apr. 8, 2015) and 62/210,166 (filed Aug. 26, 2015).

BACKGROUND

The present invention relates to fans, and more particularly to fan blades with structural, mass, and/or flow improvement features.

Fans, such as fans for automotive applications, take a variety of forms. Axial flow fans are the most common type for automotive applications. Historic designs include fans that are manufactured at a given diameter and then blade tips are trimmed to alter a fan diameter, and fans that are manufactured with specific flow optimization at the blade tips and are only offered at a single diameter (e.g., ring fans). In one aspect of the present invention, it is desired to provide an axial flow fan blade that provides fluid flow improvement, in terms of reduced air recirculation and turbulence that generates acoustic noise, through ribs or other structures located along the pressure and/or suction side of the blade. It is further desired to provide a modular axial flow fan assembly and associated method utilizing fan blades to provide fans at different diameters without destroying or damaging fluid flow modulating structures, such as those at or near blade tips.

Furthermore, cooling systems for automotive applications carry an inherent weight penalty. That is, cooling systems, including fans, must be carried by the automobile and therefore contribute to the mass of the vehicle and the fuel consumption required to move the mass of the vehicle. Moreover, the energy needed to rotate a fan depends in part upon the mass of the fan blades. Fan blades with higher mass require more energy to rotate to perform desired work. Relatively high-mass fan blades also tend accelerate more slowly and may operate at lower speeds for a given energy input, relatively to a hypothetical fan with lower-mass blades. Therefore, fan blades used in automotive applications should be as lightweight as possible. Yet fans must still be structurally sound in order to withstand expected operating conditions over a relatively long lifespan. Historic designs include fans that are manufactured of homogeneous blade material (such as metal or molded polymers), or of a composite material with a "solid" cross-section (i.e., a uniform thickness). Fan blades tend to become less stiff as material is removed, such as by making the fan blades uniformly thinner, which may present challenges in terms of structural integrity and blade lifespan and reliability. It is therefore desired to provide an axial flow fan blade that has a relatively low mass, while maintaining suitable structural integrity, durability and reliability.

SUMMARY

A fan blade according to one aspect of the present invention can include a working region having a leading edge, a trailing edge, a pressure side, a suction side and a tip, and a plurality of flow modification features positioned at the working region. The plurality of flow modification features can include a first flow modification feature having a wedge shape with a pointed end and a wider end, and located on the pressure side, and a second flow modification feature having a wedge shape with a pointed end and a wider end, and located on the pressure side. A length of the first flow modification feature is less than a chord length of the fan blade, and the pointed end of the first flow modification feature is spaced from the leading edge. A length of the second flow modification feature is less than the chord length of the fan blade, and the pointed end of the second flow modification feature is spaced from the leading edge. The first and second flow modification features are spaced from each other to define a channel therebetween.

A fan blade according to another aspect of the present invention can include a working region having a leading edge, a trailing edge, a pressure side, a suction side and a tip, and an array of depressions on the pressure side. The working region has a thickness measured between the pressure side and the suction side. Each of the depressions in the array has a depth that locally reduces a thickness of the fan blade by at least 50%.

A fan blade according to another aspect of the present invention includes a working region having a leading edge, a trailing edge, a pressure side, a suction side and a tip; and a first flow modification feature that protrudes from the pressure side at the tip, wherein the first flow modification feature is further located at or near the leading edge, and wherein the first flow modification feature has a chordwise length less than two-thirds of a chord length of the fan blade at the tip.

The present summary is provided only by way of example, and not limitation. Each summarized aspect can optionally be used independent of any other summarized aspect, or in conjunction with any other summarized aspect. Other aspects of the present invention will be appreciated in view of the entirety of the present disclosure, including the entire text, claims and accompanying figures.

Figure 1:
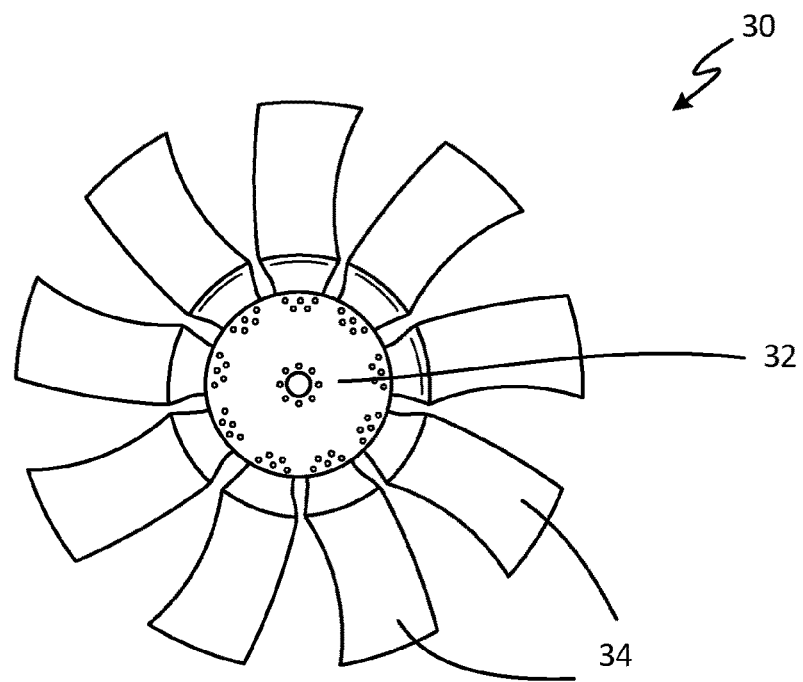
FIG. 1 is a front elevation view of a modular fan.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The fan blade, fan assembly and method of the present invention combines the benefits of an improved or optimized blade design with the flexibility of producing multiple axial flow fan configurations with a single blade design and fabrication tooling. A fan center hub can be specifically designed with flat material stock to allow a wide variety of shapes and sizes of fan centers to be produced quickly and at reasonably low manufacturing cost. A final fan assembly can retain the design benefits of individual fan blades, such as improved airflow and/or low mass construction, while also providing modular flexibility to have multiple diameter and blade count combinations that use the same blade configuration in different fan assemblies. Executing fan blade enhancements with a flexible fan hub design allows a fan manufacturer to produce multiple fan assembly configurations with reduced tooling and design cost across a full range of fan assembly configurations.

With respect to improvements of individual fan blades, features on the pressure side and/or suction side can help provide a relatively low mass fan blade with sufficient structural integrity and reliability and optionally reduces air recirculation and turbulence that generates acoustic noise and consumes additional fan power without additional airflow (i.e., desired axial airflow). Providing these benefits helps provide beneficial cooling airflow at a lower operating cost to the end user. The fan assembly and associated method of the present invention has utility in the automotive industry, as well as in other vehicular and industrial applications, and the like.

A fan assembly according to the present invention can generally include a plurality of blades with flow improving and/or mass-reducing features that are joined to a hub that that is specifically fabricated to create a desired fan outside diameter. The overall fan diameter can be adjusted by attaching given fan blades to a hub a different size. The flow features of the blades can help reduce undesirable effects such as noise and power consumption and improve the overall performance of the fan in the final application. Using the flexible design of the fan hub component to alter the fan diameter (and/or blade solidity) maintains the full design of the tip features while allowing a single manufactured version of the blade to serve numerous customer applications with varying diameters. These and other benefits and advantages of the present invention will be recognized in view of the entirety of the present disclosure.

This application claims priority to U.S. Provisional Patent Application Nos. 62/144,681 and 62/210,166, which are each hereby incorporated by reference in their entireties.

Figure 2:
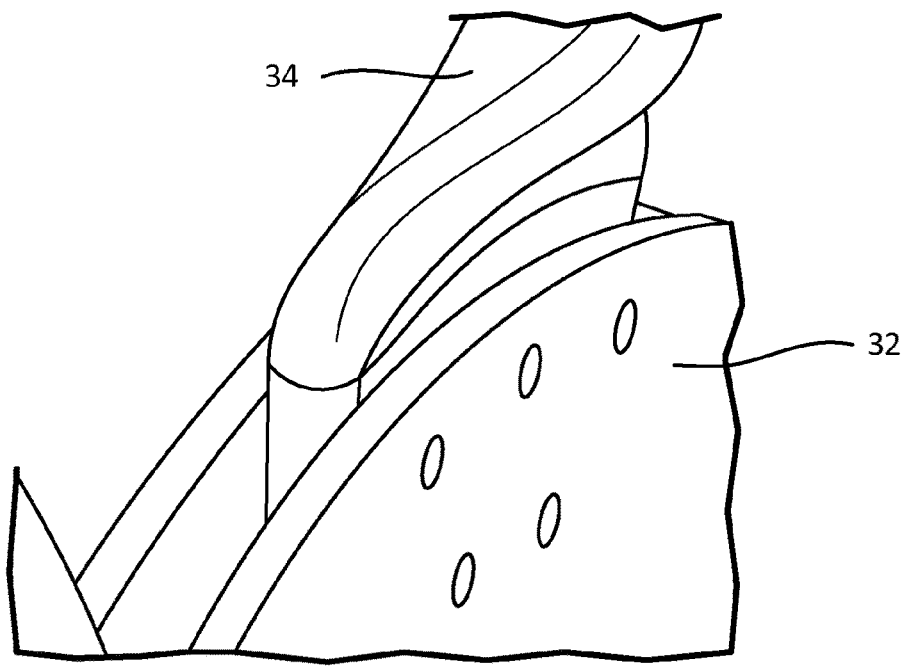
FIG. 2 is a perspective view of a portion of the modular fan of FIG. 1.

FIG. 1 is a front elevation view of an embodiment of a modular axial flow fan 30, and FIG. 2 is a perspective view of a portion of the modular fan 30. The illustrated embodiment of the modular fan 30 includes a center hub 32 and removable blades 34 attached to the hub 32. The modular fan 30 can be utilized with a separate stationary fan shroud (see FIG. 7), or without any shroud.

The center hub 32 can be configured as multiple (e.g., two) generally planar, circular plates, each having an array or arrays of holes therein for fasteners. The fan blades 34, which can be discrete, individual blades, can be attached to the center hub 32 with suitable fasteners (e.g., bolts, rivets, etc.) to create the modular fan 30.

The blades 34 can each have identical or substantially identical configurations. In the illustrated embodiment, the fan blades 34 are located in between two plates that form the center hub 32, with fasteners (e.g., bolts) passing through both hub plates 32 and the blades 34 to secure the assembly together (in FIG. 2 the fasteners are not shown to reveal the holes in the hub 32). The blades 34 can easily be removed from the center hub 32, if desired, simply by removing the fasteners. Damaged fans 30 can therefore be repaired by removing the damaged blade(s) 34 and attaching new blade(s) 34.

The same blades 34 can be connected to a variety of differently configured center hubs 32 to provide a variety of configurations of the modular fan 30, such as to have an axial fan assembly with varying blade count, blade solidity and/or outer diameter. For instance, center hubs 32 having different diameters can be made, and the fan blades 34 attached to the hub 32 with a desired diameter to provide a suitable overall diameter of the modular fan 30 without the need to trim the blades 34 or redesign the blades 34. Moreover, in addition or in the alternative, a given center hub 32 can have multiple arrays of holes, such that the fan blades 34 can be attached in different positions, allowing for different fan solidities to be achieved (by increasing or decreasing the number of the attached blades 34) and/or small adjustments to diameter using a given hub 32. However, more significant changes to fan diameter can be most easily accomplished by substituting a differently sized center hub 32. Because the center hub 32 has a relatively simply plate-like configuration, and because the center hub 32 itself does not require aerodynamic analysis for redesign, the modular fan 30 allows for modularity with a much less design and testing effort than if new blades 34 were designed for each overall fan configuration, while avoiding the destruction of fan features (such a flow improvement features discussed below) that would otherwise be caused by cutting down blade tips to reduce blade radial dimensions from a default maximum value (as in the prior art). Details of embodiments of fan blades 34 are described with respect to FIGS. 3-16.

Figure 3:
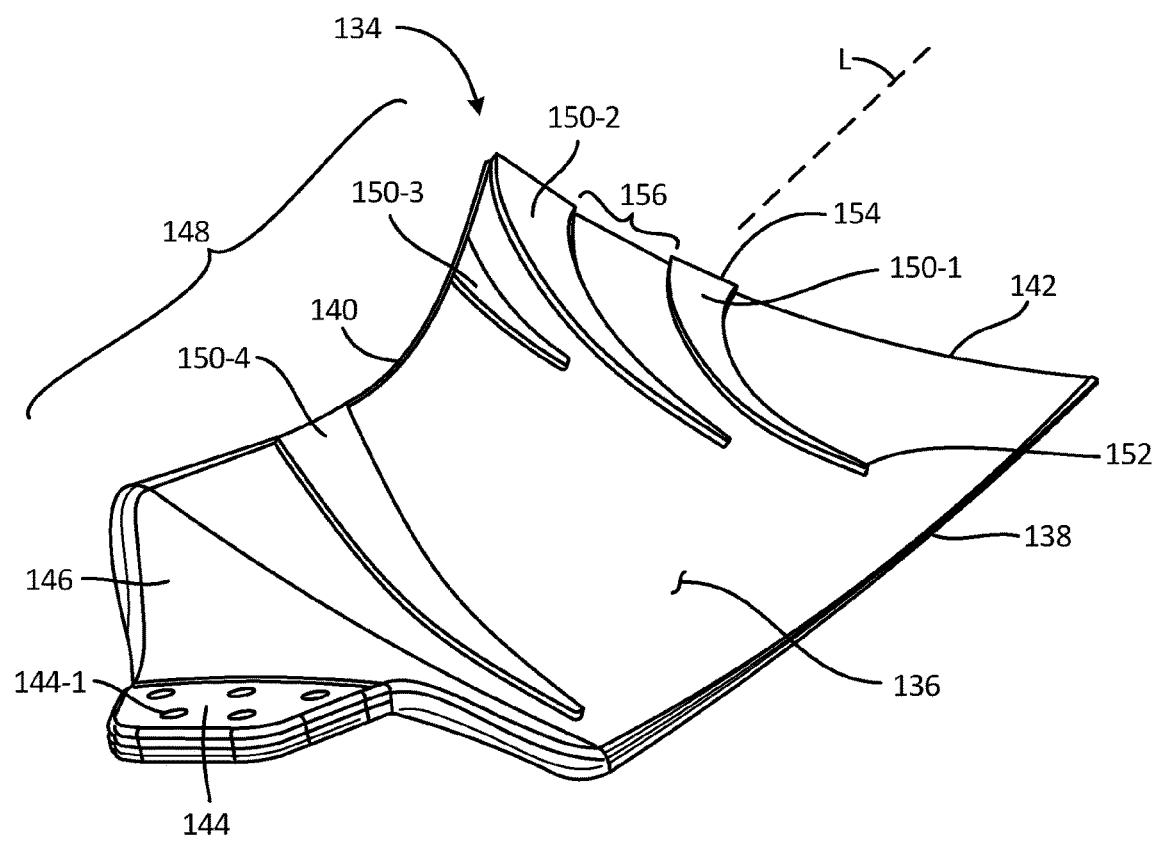
FIG. 3 is a perspective view of an embodiment of a fan blade of the present invention, shown in isolation from a pressure side.

FIG. 3 is a perspective view of an embodiment of a blade 134, shown in isolation from a pressure side 136. The blade 134 has a leading edge 138, an opposite trailing edge 140, a tip 142 and an attachment portion 144 (also called a root or heel). A working region (or airfoil portion) 148 of the blade 134 extends between the leading and trailing edges 138 and 140, and encompasses the pressure side 136 and an opposite suction side (not visible in FIG. 3). A transition zone 146 can be provided between the attachment portion 144 and the working region 148. The fan blade 134 is suitable for use with the fan 30 described above. In alternative embodiments, the fan blade 134 can be used with a different type of fan, such as a non-modular, one-piece molded fan. These example applications are provided merely by way of example and not limitation. Persons of ordinary skill in the art will appreciate that the fan blade 134 can be utilized in a variety of applications, with suitable adaptations and optional features tailored to those applications.

The attachment portion 144 can be substantially flat or planar, and can include a suitable array of a plurality of holes 144-1 to accommodate fasteners for attachment to the hub 32. It should be noted that the configuration of the attachment portion 144 in FIG. 3 is shown merely by way of example and not limitation. In alternate embodiments other configurations of the attachment portion 144 can be used, such as knobs, dovetails, and the like.

The transition zone 146 can be a relatively highly twisted region outside the working region 148 that helps to position the working region 148 in a desired orientation relative to the attachment portion 144. The transition zone 146 is generally not aerodynamically designed and is not intended to provide useful work to move or pressurize fluid during operation of the fan 30.

The working region 148 can extend from the transition zone 146 to the tip 142. Particular characteristics of the blade 134, such as chord length, radial (i.e., spanwise) dimensions, thickness, twist, camber, sweep, lean, bow, dihedral, etc. can be provided as desired for particular applications. For example, in one embodiment the blade 134 can have a configuration like that disclosed in commonly-assigned PCT Patent App. Pub. No. WO2015/171446.

One or more flow modification features 150-1 to 150-4 are provided on the pressure side 136 in the illustrated embodiment of FIG. 3. The flow modification features 150-1 to 150-4 can each be configured as flow guide vanes, ribs or other suitable structures. In the illustrated embodiment, the flow modification features 150-1 to 150-4 are each integrally and monolithically formed with a remainder of the working region 148 of the blade 134, but can be separate structures attached to the pressure side 136 in alternate embodiments. Any of all of the flow modification features 150-1 to 150-4 can have a wedge-like shape, with a narrow or pointed end 152 (e.g., apex) located generally upstream or closer to the leading edge 138 and a wider end 154 located generally downstream or closer to the trailing edge 140. Each flow modification feature 150-1 to 150-4 can also have a curved shape, with the pointed end 152 located radially inward from the wider end 154, such that fluid flow passing along the given flow modification feature 150-1 to 150-4 is turned, relative to the radial direction, when passing between the narrow end 152 and the wider end 154. For instance, the curve of a given flow modification feature 150-1 to 150-4 can redirect fluid flow from a substantially chordwise direction to a substantially radial direction (i.e., a 90° change in flow direction). In the chordwise direction, the flow modification features 150-1 to 150-4 can have lengths that are less than a chord length of the blade 134 at the corresponding radial (spanwise) location, that is, the flow modification features 150-1 to 150-4 can each occupy less than the entire chord length of the blade 134. The flow modification features 150-1 to 150-3 can be located proximate the tip 142, such as within a radially outer half of the working region 148, or preferably within the radially outer 40% of the working region 148. The flow modification features 150-1 to 150-3 located proximate the tip 142 can partially overlap one another in the chordwise direction, and the more downstream of the tip features 150-2 and 150-2 can extend to or very near to the trailing edge 140. The flow modification features 150-1 to 150-3 can each have different lengths in the chordwise direction. For instance, the flow modification feature 150-2 can be longer than the flow modification feature 150-1, and the flow modification feature 150-1 can be longer than the flow modification feature 150-3. The particular angles, widths, curvatures, thicknesses, and other characteristics of the flow modification features 150-1 to 150-4 can vary for each such feature, although some or all of those characteristics (e.g., thickness) can be the same for multiple flow modification features 150-1 to 150-4.

In one embodiment shown in FIG. 3, the flow modification feature 150-1 has the pointed end 152 located at approximately 11% of the chord length from the leading edge 138 and approximately 30% of the radial (spanwise) length of the working region 148 from the tip 142, and has a midpoint of the wider end 154 located approximately 64% of the chord length from the leading edge 138 and at (i.e., aligned with) the tip 142 in the radial (spanwise) direction. The wide end 154 of the flow modification feature 150-1 can have a width approximately 10% of the chord length at the tip 142, while the pointed end 152 can form an apex, which can have an eased curvature. A thickness of the flow modification feature 150-1 (i.e., the amount of protrusion of the flow modification feature 150-1 from the pressure side 136 in a direction of the thickness of the blade 134) can be approximately 2-3 mm (0.08 to 0.12 inch), or approximately 100% of a corresponding thickness of the blade 134 at the tip 142. The thickness of the flow modification feature 150-1 can be constant, from the pointed end 152 to the wider end 154, though in alternate embodiments the thickness of the flow modification feature 150-1 can vary monotonically or non-monotonically between the pointed end 152 and the wider end 154. The flow modification feature 150-2 has the pointed end 152 located at approximately 45% of the chord length from the leading edge 138 and at approximately 34% of the radial (spanwise) length of the working region 148 from the tip 142, and has an aft edge of the wider end 154 located at (i.e., aligned with) the trailing edge 140 (or with a midpoint of the wider end 154 at approximately 91% of the chord length from the leading edge 138) and the wider end 154 at (i.e., aligned with) the tip 142 in the radial (spanwise) direction. The wide end 154 of the flow modification feature 150-2 can have a width approximately 15% of the chord length at the tip 142, while the pointed end 152 can form an apex, which can have an eased curvature. A thickness of the flow modification feature 150-2 can be approximately 2-3 mm (0.08 to 0.12 inch), or approximately 100% of a corresponding thickness of the blade 134 at the tip 142. Like the flow modification feature 150-1, the thickness of the flow modification feature 150-2 can be constant or can vary. Furthermore, the thickness of the flow modification feature 150-2 can be the same as that of the flow modification feature 150-1, or can be different than the flow modification feature 150-1. The flow modification feature 150-3 has the pointed end 152 located at approximately 76% of the chord length from the leading edge 138 and at approximately 33% of the radial (spanwise) length of the working region 148 from the tip 142, and has the wider end 154 located at (i.e., aligned with) the trailing edge 140 and with a midpoint of the wider end 154 at approximately 28% of the radial (spanwise) length of the working region 148 from the tip 142. A curvature of the flow modification feature 150-3 can be less than that of the flow modification features 150-1 and 150-2. The wide end 154 of the flow modification feature 150-3 can have a width approximately 9% of the radial (spanwise) length of the working region 148 of the blade 134, while the pointed end 152 can form an apex, which can have an eased curvature. A thickness of the flow modification feature 150-3 can be approximately 2-3 mm (0.08 to 0.12 inch), or approximately 100% of a corresponding thickness of the blade 134 at the wider end 154 of the flow modification feature 150-3. Like the flow modification features 150-1 and 150-2, the thickness of the flow modification feature 150-3 can be constant or can vary. Furthermore, the thickness of the flow modification feature 150-3 can be the same as that of the flow modification feature 150-1 and/or 150-2, or can be different than the flow modification features 150-1 and/or 150-2.

The flow modification features 150-1, 150-2 and 150-3 can be grouped relatively close together proximate the tip 142, with flow channels 156 defined between adjacent features 150-1 to 150-3. In one embodiment, the pointed ends 152 of the flow modification features 150-2 and 150-3 are approximately radially aligned (i.e., at approximately the same radial or spanwise location) while the pointed end 152 of the flow modification feature 150-1 is located radially outward from the pointed ends 152 of the flow modification features 150-2 and 150-3. In another aspect, the pointed end of the flow modification feature 150-1 is located radially outward from a projected line connecting the pointed ends 152 of the flow modification features 150-2 and 150-3. All of the flow modification features 150-1 to 150-3 can be spaced from the leading edge 138. The flow channels 156 defined between the flow modification features 150-1 to 150-3 are generally curved toward the tip 142, and can extend to the tip 142, to help guide fluid flow from a generally mid-chord and mid-span location along the pressure side 136 aft and toward the tip 142 (as used herein, mid-chord and mid-span do not refer to the exact midpoints). Some or all of the flow channels 156 can also widen in the downstream direction. Some or all of the flow channels 156 can help guide fluid flow along the pressure side 136 beyond a location of a fan shroud (not shown) at location L, when the fan 30 is utilized in conjunction with a separate fan shroud. A direction of fluid flow along the pressure side 136 can be unconstrained upstream of any or all of the channels 156.

As further shown in the embodiment of FIG. 3, the flow modification feature 150-4 can be located proximate the transition zone 146 and the attachment portion 144, and can be spaced from the flow modification features 150-1 to 150-3 located proximate the tip 142. In this way a middle portion of the working region 148 can be free of flow modification features, allowing substantially unmodified fluid flow along the pressure side 136 in that middle portion. The flow modification feature 150-4 has the pointed end 152 located at approximately 11% of the chord length from the leading edge 138 and at approximately 96% of the radial (spanwise) length from the tip 142, and has the wider end 154 located at (i.e., aligned with) the trailing edge 140 and with a midpoint of the wider end 154 approximately 69% of the radial (spanwise) length from the tip 142. A thickness of the flow modification feature 150-4 can be approximately 2-3 mm (0.08 to 0.12 inch), or approximately 80-100% of a corresponding thickness of the working region 148 of the blade 134. Like the flow modification features 150-1 to 150-3, the thickness of the flow modification feature 150-4 can be constant or can vary. Furthermore, the thickness of the flow modification feature 150-4 can be the same as that of any of the flow modification features 150-1 to 150-3, or can be different than the flow modification features 150-1 to 150-3.

It should be noted that the embodiment shown in FIG. 3 is provided merely by way of example and not limitation. Other configurations are contemplated with fewer or greater numbers of pressure side flow modification features, different layouts and dimensions, etc. Moreover, the particular dimensions shown in the embodiment of FIG. 3 and described above are provided merely by way of example and not limitation, and in further embodiments other dimensions and proportions are possible. For example, in a further embodiment an additional flow modification feature can be provided proximate the transition zone 146, located generally radially inward and aft of the flow modification feature 150-4 shown in FIG. 3.

In operation, at least the flow modification features 150-1 to 150-3 direct air passing along the pressure side 136 in generally the chordwise direction (between the leading and trailing edges 138 and 140) into a more radially (spanwise) outward direction, including at least some of the flow modification features directing fluid into a purely radial direction off of the tip 142. Discharging fluid off the tips 142 of the blades 134 on the pressure side 136 in this manner creates a shorter airflow path on the pressure side than on the suction side and thereby enhances a pressure differential of the blade 134 for better performance at higher system restriction of fan operation. The flow modification features 150-1 to 150-4 can also help prevent the formation of large eddies that otherwise tend to propagate off the blade 134, thereby helping to decrease noise and power consumption of the fan 30 during operation.

Flow modification features (of the pressure and/or suction sides) can also help direct discharge flow from the fan 30 in a beneficial orientation to travel through heat exchanger core fins when the fan 30 is used to blow fluid through a cooling package (e.g., blower fan applications used with an automotive radiator).

The relatively compact size and selective placement of the flow modification features 150-1 to 150-3 can also help minimize a mass penalty to the fan blade 134.

Figure 4:
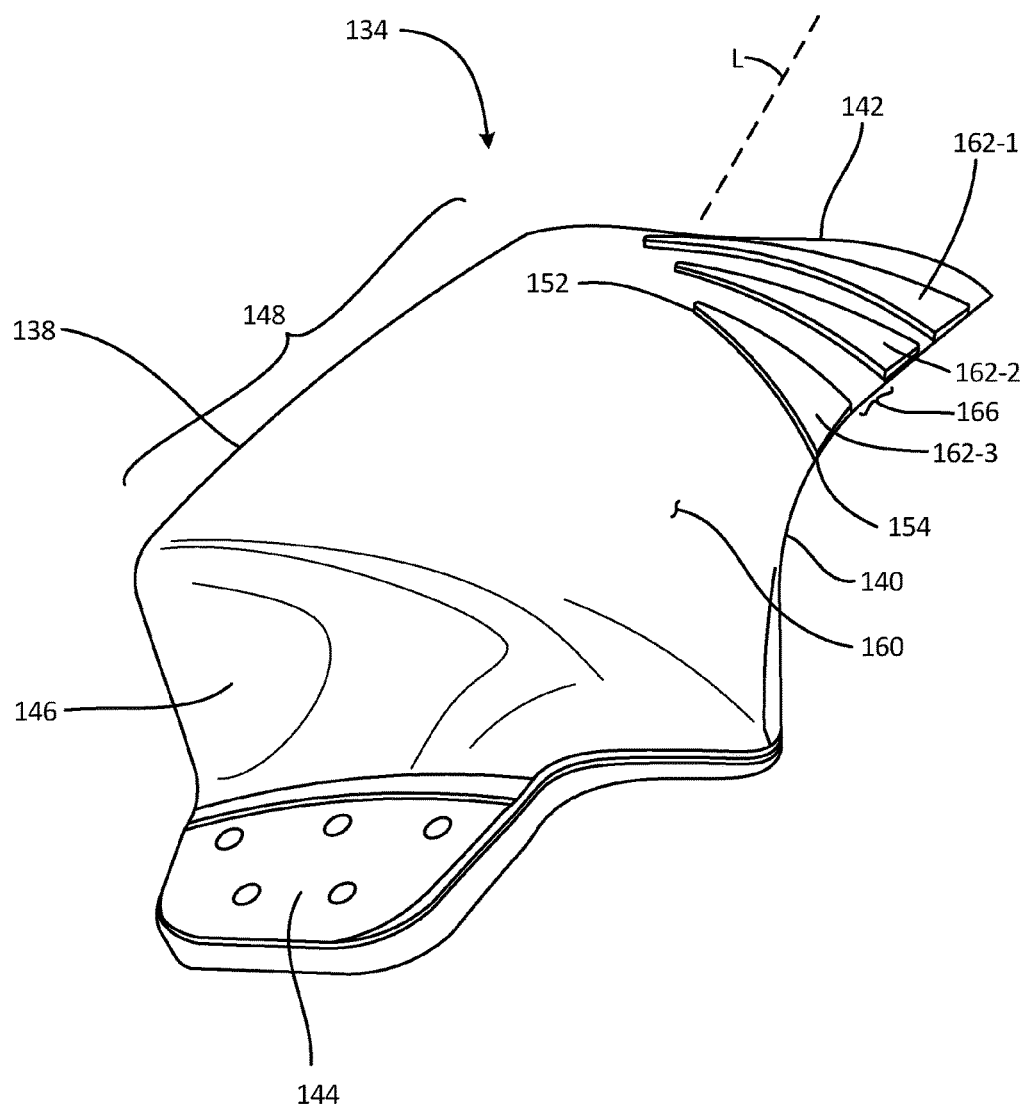
FIG. 4 is a perspective view of the fan blade of FIG. 3, shown in isolation from a suction side.

FIG. 4 is a perspective view of the fan blade of FIG. 3, shown in isolation from a suction side 160, which includes one or more flow modification features 162-1 to 162-3. The flow modification features 162-1 to 162-3, like the flow modification features 150-1 to 150-4, can each be configured as flow guide vanes, ribs or other suitable structures. In the illustrated embodiment, the flow modification features 162-1 to 162-3 are each integrally and monolithically formed with a remainder of the working region 148 of the blade 134, but can be separate structures attached to the pressure side 136 in alternate embodiments. Any of all of the flow modification features 162-1 to 162-3 can have a wedge-like shape, with a narrow or pointed end 152 (e.g., apex) located generally upstream or closer to the leading edge 138 and a wider end 154 located generally downstream or closer to the trailing edge 140. Each flow modification feature 162-1 to 162-3 can also have a curved shape, such that fluid flow passing along the given flow modification feature 162-1 to 162-3 is turned, relative to the radial direction, when passing between the narrow end 152 and the wider end 154, such as to redirect fluid flow from a substantially chordwise direction to a more radial direction (e.g., a 30° or more change in flow direction, and preferably a 70° for more change in flow direction). In the chordwise direction, the flow modification features 162-1 to 162-3 can have lengths that are less than a chord length of the blade 134 at the corresponding radial (spanwise) location, that is, the flow modification features 162-1 to 162-3 can each occupy less than the entire chord length of the blade 134. The flow modification features 162-1 to 162-3 can partially overlap one another in the chordwise direction, and can extend to or very near to the trailing edge 140. The particular angles, widths, curvatures, thicknesses, and other characteristics of the flow modification features 162-1 to 162-3 can vary for each such feature, although some or all of those characteristics (e.g., thickness) can be the same for multiple flow modification features 162-1 to 162-3.

The flow modification features 162-1 to 162-3 on the suction side can redirect fluid passing generally in the chordwise direction along the suction side 160 in a more radially (spanwise) inward direction, toward the attachment portion 144 and the transition zone 146 (and the central hub 32). In other words, the flow modification features 162-1 to 162-3 can help redirect fluid flow in a radial direction opposite that of the flow modification features 150-1 to 150-4 on the pressure side 136. Moving fluid inward along the suction side 160 can increase the total distance fluid travels across the blade 134 on the suction side 160, thereby helping create a higher pressure differential from the pressure side 136 to the suction side 160 of the blade 134.

In the embodiment shown in FIG. 4, there are a total of three suction side flow modification features 162-1 to 162-3, all of which are wedge shaped and located proximate the tip 142. As shown in the embodiment of FIG. 4, the flow modification feature 162-1 has the pointed end 152 located at approximately 29% of the chord length from the leading edge 138 and approximately 7% of the radial (spanwise) length of the working region 148 from the tip 142, and has a midpoint of the wider end 154 located approximately 12% of the radial (spanwise) length from tip 142. The wide end 154 of the flow modification feature 162-1 can have a width approximately 11% of the radial (spanwise) length of the working region 148, while the pointed end 152 can form an apex, which can have an eased curvature. A curvature of the flow modification feature 162-1 can be less than that of the flow modification features 162-1 and 162-2. Moreover, an upper edge of the flow modification feature 162-1 can be roughly equally spaced from the tip 142 while an opposite inner edge can be positioned more radially inward toward the trailing edge 140. A thickness of the flow modification feature 162-1 (i.e., the amount of protrusion of the flow modification feature 162-1 from the suction side 160 in a direction of the thickness of the blade 134) can be approximately 2-3 mm (0.08 to 0.12 inch), or approximately 120% of a corresponding thickness of the blade 134 at the trailing edge 140 near the tip 142. The thickness of the flow modification feature 162-1 can be constant, from the pointed end 152 to the wider end 154, though in alternate embodiments the thickness of the flow modification feature 162-1 can vary monotonically or non-monotonically between the pointed end 152 and the wider end 154. The flow modification feature 162-2 has the pointed end 152 located at approximately 45% of the chord length from the leading edge 138 and at approximately 20% of the radial (spanwise) length of the working region 148 from the tip 142, and has the wider end 154 located at (i.e., aligned with) the trailing edge 140 and a midpoint of the wider end 154 at approximately 26% of the radial (spanwise) length from the tip 142. The wide end 154 of the flow modification feature 162-2 can have a width approximately 9% of the radial (spanwise) length of the blade 134, while the pointed end 152 can form an apex, which can have an eased curvature. A thickness of the flow modification feature 162-2 can be approximately 2-3 mm (0.08 to 0.12 inch), or approximately 120% of a corresponding thickness of the blade 134 at the wider end 154 of the flow modification feature 162-2. Like the flow modification feature 162-1, the thickness of the flow modification feature 162-2 can be constant or can vary. Furthermore, the thickness of the flow modification feature 162-2 can be the same as that of the flow modification feature 162-1, or can be different than the flow modification feature 162-1. The flow modification feature 162-3 has the pointed end 152 located at approximately 57% of the chord length from the leading edge 138 and at approximately 31% of the radial (spanwise) length of the working region 148 from the tip 142, and has the wider end 154 located at (i.e., aligned with) the trailing edge 140 and with a midpoint of the wider end 154 at approximately 57% of the radial (spanwise) length from the tip 142. The wide end 154 of the flow modification feature 162-3 can have a width approximately 13% of the radial (spanwise) length of the blade 134, while the pointed end 152 can form an apex, which can have an eased curvature. A thickness of the flow modification feature 162-3 can be approximately 2-3 mm (0.08 to 0.12 inch), or approximately 120% of a corresponding thickness of the blade 134 at the wider end 154 of the flow modification feature 162-3. Like the flow modification features 162-1 and 162-2, the thickness of the flow modification feature 162-3 can be constant or can vary. Furthermore, the thickness of the flow modification feature 162-3 can be the same as that of the flow modification feature 162-1 and/or 162-2, or can be different than the flow modification features 162-1 and/or 162-2.

The flow modification features 162-1, 162-2 and 162-3 can be grouped relatively close together proximate the tip 142, with flow channels 166 defined between adjacent features 162-1 to 162-3. All of the flow modification features 162-1 to 162-3 can spaced from the leading edge 138. The flow channels 166 between the flow modification features 162-1 to 162-3 are generally curved toward the transition zone 146 and attachment portion 144 (and the central hub 32 of the fan 30), to help guide fluid flow along the suction side 160 aft and away from the tip 142. Some or all of the flow channels 166 can also widen in the downstream direction. The flow channels 166 can help guide fluid flow along the suction side 136 beyond a location of a fan shroud (not shown) at the location L, when the fan 30 is utilized in conjunction with a separate fan shroud.

The wider ends 154 of the suction side features 162-1 to 162-3 are each located along the trailing edge 140 of the blade 134. A curvature and associated discharge angle of the flow modification features 162-1 to 162-3 is flatter for the outermost feature 162-1 and greater (i.e., more radially inward) for the innermost feature 162-3. The pointed ends 152 of the suction side features 162-1 to 162-3 can be closely positioned to each other. The configuration illustrated in FIG. 4 is shown merely by way of example and not limitation. Other configurations are possible with fewer or greater numbers of suction side features, different layouts, dimensions, proportions, etc. Moreover, the particular dimensions designated shown in FIG. 4 and described above are provided merely by way of example and not limitation, and in further embodiments other dimensions and proportions are possible.

Flow modification features 150-1 to 150-4 and 162-1 to 162-3 can be combined to help optimize the pressure performance, noise, efficiency, and/or directionality of the discharge of fluid. That is, pressure and suction side features 150-1 to 150-4 and 162-1 to 162-3 can be used together on a given blade 134. When used together, the flow modification features 150-1 to 150-4 and 162-1 to 162-3 on the pressure and suction sides 136 and 160 can urge fluid flow in generally opposite radial directions, such as more outward on the pressure side 136 and more inward on the suction side 160. Alternatively, only pressure or suction side features 150-1 to 150-4 or 162-1 to 162-3 can be used in alternative embodiments, with nearly any overall design of the blade 134.

Figure 5:
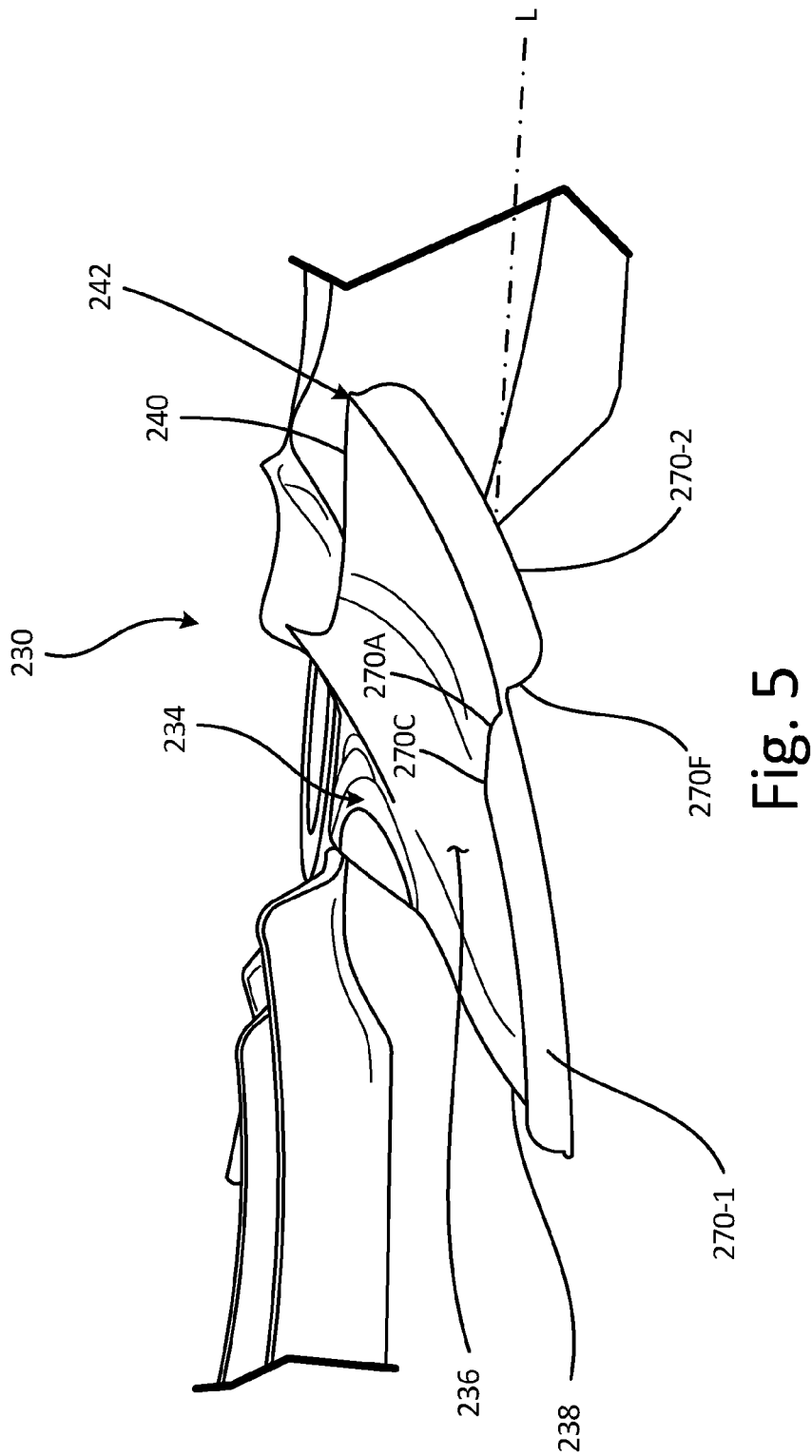
FIG. 5 is a plan view of another embodiment of a fan with a fan blade according to the present invention, shown looking inward from a tip of the fan blade.
Figure 6:
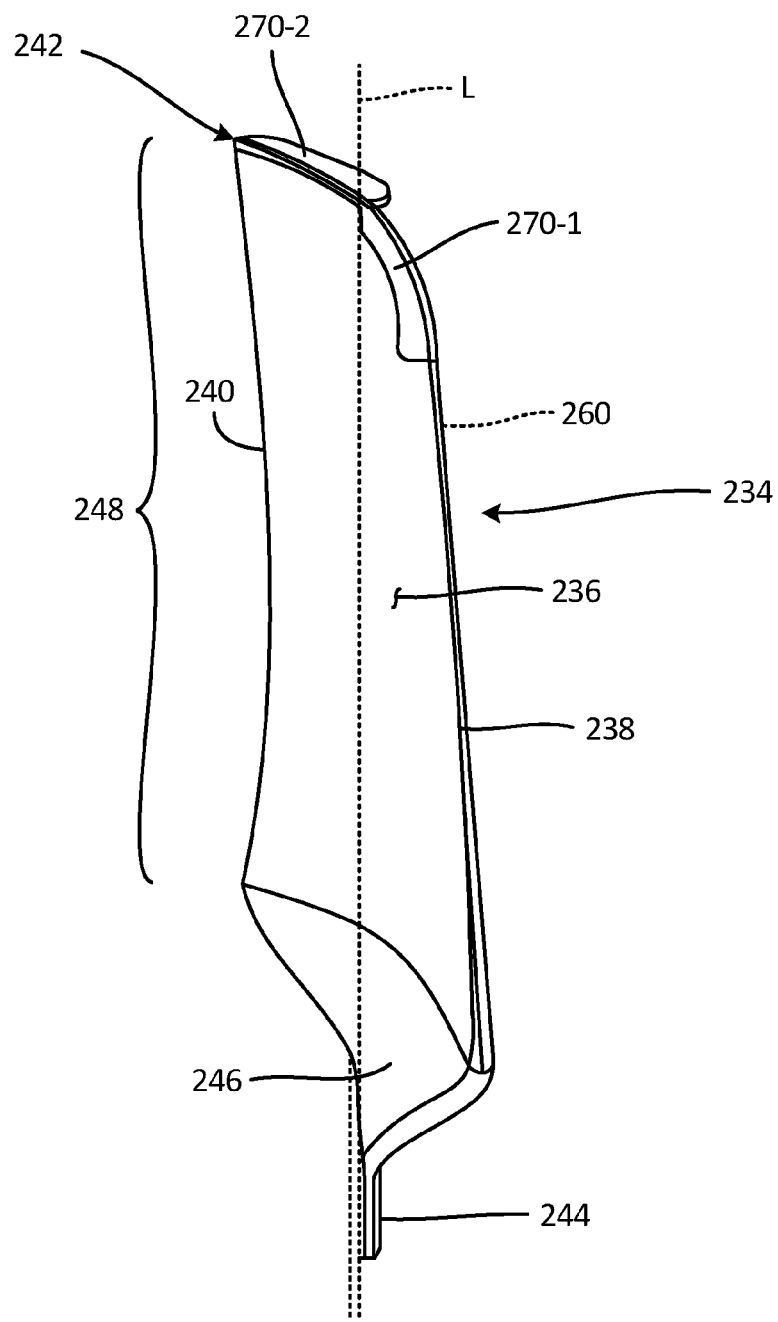
FIG. 6 is a side elevation view of the fan blade of FIG. 5.
Figure 7:
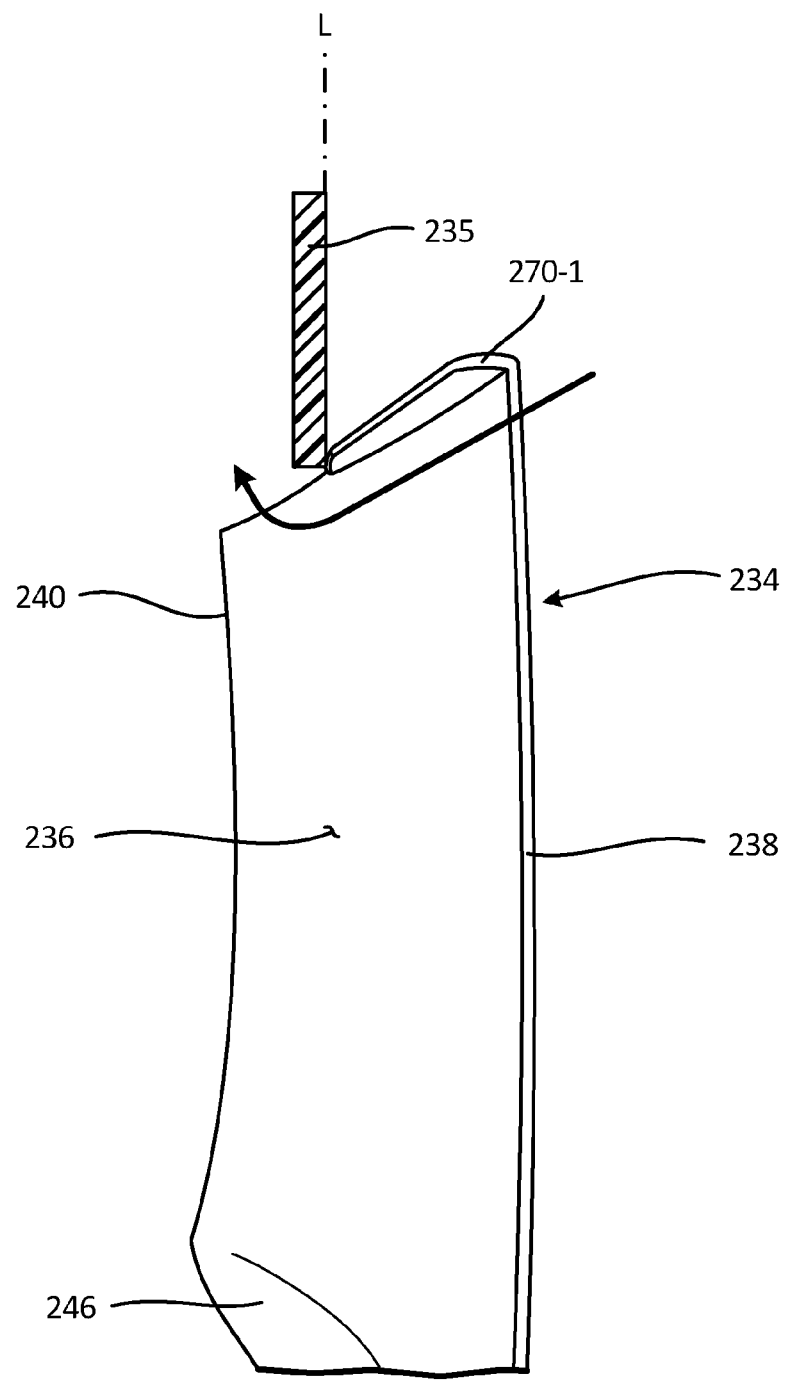
FIG. 7 is a schematic perspective view of the blade of FIGS. 5 and 6 with a fan shroud.

FIG. 5 is a plan view of another embodiment of a fan 230 having a fan blade 234, FIG. 6 is a side elevation view of the fan blade 234, and FIG. 7 is a schematic perspective view of the blade 234 with a fan shroud 235. The blade 234 can function generally similar to the blades 34 and 134 described above, with additional (or alternative) flow modification aspects described further below. The fan blade 234 includes a pressure side 236, a leading edge 238, a trailing edge 240, a tip 242, and attachment portion 244, a transition zone 246, a working region 248, and a suction side 260. Further, the fan blade 234 of the illustrated embodiment includes flow modification features 270-1 and 270-2. In alternative embodiments, only one or the other of the flow modification features 270-1 and 270-2 can be used and the other omitted. The fan blade 234 is suitable for use with the fan 30 described above. In alternative embodiments, the fan blade 234 can be used with a different type of fan, such as a non-modular, one-piece molded fan. These example applications are provided merely by way of example and not limitation. Persons of ordinary skill in the art will appreciate that the fan blade 234 can be utilized in a variety of applications, with suitable adaptations and optional features tailored to those applications.

As shown in the embodiment of FIGS. 5-7, the flow modification features 270-1 and 270-2 are both located at or aligned with the tip 242, and thereby act as partial shrouds, winglets or "tip ribs". In the illustrated embodiment, the flow modification feature 270-1 is located at a forward portion of the pressure side 236 and the flow modification feature 270-2 is located at an aft portion of the suction side 260, and both features 270-1 and 270-2 extend generally perpendicular to the corresponding pressure or suction side 236 or 260 of the blade 234 (i.e., at absolute values of dihedral angles of approximately 190° 1 relative to adjacent areas of the blade 234). An entire length of each of the flow modification features 270-1 and 270-2 (in the chordwise direction) can be aligned with the tip 242. The flow modification features 270-1 and 270-2 each have a chordwise length less than a chord length of the blade 234 at the tip 242, such as less than two-thirds of the chord length at the tip 242. The flow modification features 270-1 and 270-2 can be arranged so as not to overlap each other in the chordwise direction, meaning that the flow modification features 270-1 and 270-2 can occupy chordwise regions that are contiguous (but not overlapping) or spaced from each other. The flow modification features 270-2 can have a shorter chordwise length than the flow modification feature 270-1. For example, in the illustrated embodiment the flow modification feature 270-1 has a length of approximately 57% of the chord of the blade 234 at the tip 242 and the flow modification feature 270-2 has a length of approximately 41% of the chord of the blade 234 at the tip 242. Furthermore, as best seen in FIG. 5, a small chordwise gap can be provided between an aft edge 270A of the flow modification features 270-1 and a forward edge 270F of the flow modification features 270-2.

The flow modification features 270-1 and 270-2 can be configured (e.g., in terms of shape and location) in relation to a location L of the shroud 235, which defines a split point between forward and aft sides of the shroud 235. As shown in FIGS. 5 and 6, the location L can be visualized as a plane (normal to an axis of rotation of the fan 30) that is aligned with a pressure side face of the attachment portion 244 of the blade 234, although other arrangements are possible in further embodiments. In the illustrated embodiment, the flow modification feature 270-1 is located no further aft that the plane of the location L. As shown in FIG. 7, the flow modification feature 270-1 is located forward of the shroud 235. A chamfer 270C is located at or adjacent to the aft edge 270A of the flow modification feature 270-1. The chamfer 270C can be arranged substantially parallel to the plane of the location L (and can be arranged substantially normal to the axis of rotation of the fan 30), such that the flow modification feature 270-1 does not extend aft of the location L. The gap between the flow modification features 270-1 and 270-2 can be positioned at or near the location L. A majority (e.g., approximately 89%) of the flow modification feature 270-2 is located aft of the location L, though a portion of the flow modification feature 270-2 extends forward of the location L. In other embodiments the flow modification feature 270-2 can be located entirely aft of the location L.

The flow modification features 270-1 and 270-2 can each have a rectangular cross-sectional shape and can each follow a chordwise curvature of the tip 242, but can otherwise have a general appearance of being "flat" or shelf-like formations. Aside from the chamfer 270C, each of the flow modification features 270-1 and 270-2 can have eased or rounded edges at or near the forward and/or aft edges 270F and 270A. In one embodiment, each flow modification feature can have a dimension protruding from the respective pressure or suction side 236 or 260 in a direction of the thickness of the blade 234 that is approximately 300% of a thickness of the blade 234 at the tip 242.

With prior art axial fans and shroud assemblies, there is significant recirculation of fluid that does not efficiently pass past the associated fan shroud in the axial direction. However, the flow modification features 270-1 and 270-2 help guide fluid flow moved by the fan blade 234 axially past the fan shroud 235, thereby helping to reduce recirculation and helping to promote efficient operation. More particularly, the flow modification feature 270-1 acts like a partial shroud to limit fluid flow with a radially outward component moving off the tip 242 at a forward side of the shroud 235 (and forward of the location L), to help ensure that nearly all fluid moved by the blade 234 is moved axially past the shroud 235 (and the location L). Furthermore, the flow modification feature 270-2 can help limit eddies and other undesired flow recirculation aft of the shroud 235 (and the location L).

The flow modification features 270-1 and/or 270-2 can be combined with the flow modification features 150-1 to 150-4 and/or 160-1 to 160-3, or can be used separately and independently. It should further be noted that the particular configurations of the flow modification features 270-1 and 270-2 shown in the figures and described above are taught merely by way of example and not limitation. Other configurations are possible in further embodiments, such as to have different sizes, different cross-sectional shapes, with added fillets for structural support, etc.

Figure 8A:
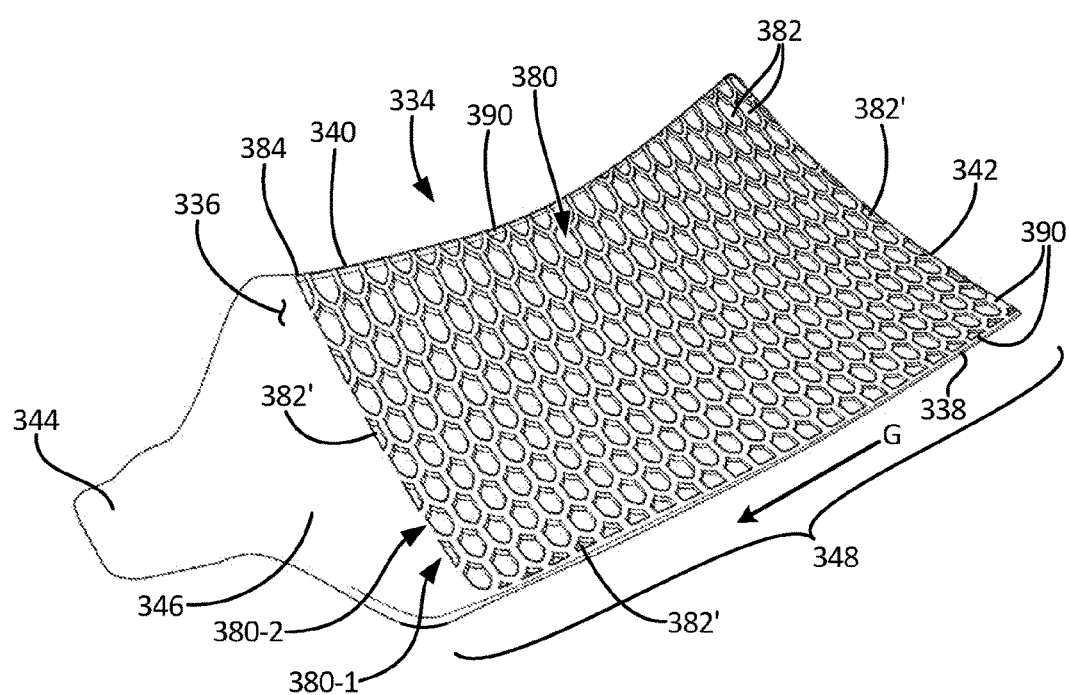
FIG. 8A is a perspective view of another embodiment of a fan blade according to the present invention, shown from a pressure side.
Figure 8B:
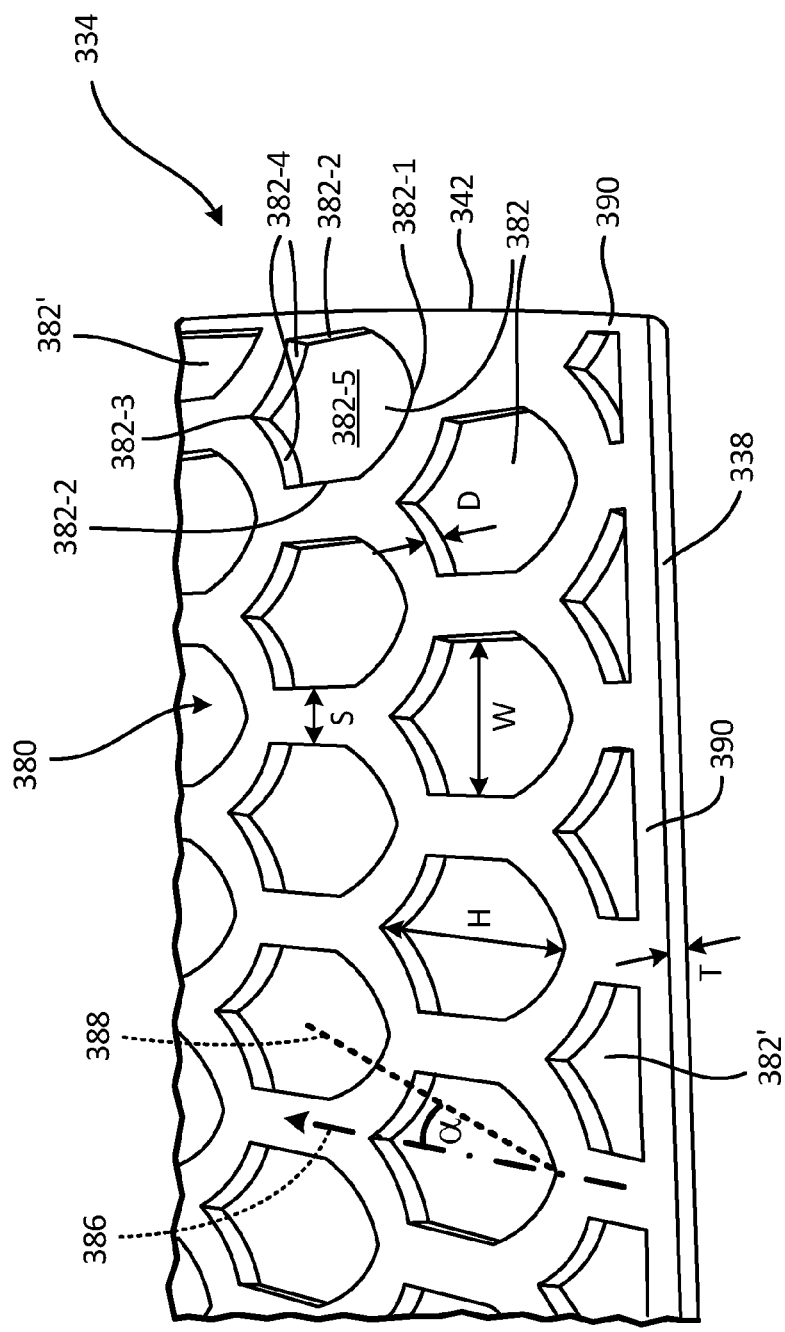
FIG. 8B is an enlarged perspective view of the fan blade of FIG. 8A.

FIGS. 8A and 8B illustrate another embodiment of a fan blade 334. FIG. 8A is a perspective view of the fan blade 334, shown from a pressure side 336, and FIG. 8B is an enlarged perspective view of the fan blade 334. The blade 334 can function generally similar to the blades 34, 134 and 234 described above, with additional (or alternative) mass-reduction features described further below. The fan blade 334 includes a pressure side 336, a leading edge 338, a trailing edge 340, a tip 342, attachment portion 344, a transition zone 346, a working region 348, and a suction side (not visible). Further, the fan blade 334 of the illustrated embodiment includes an array 380 of depressions 382 that locally reduce a nominal thickness of the fan blade 334. The fan blade 334 is suitable for use with the fan 30 described above. In alternative embodiments, the fan blade 334 can be used with a different type of fan, such as a non-modular, one-piece molded fan. An outer ring or shroud connecting blades of the fan assembly can optionally be provided in some embodiments. These example applications are provided merely by way of example and not limitation. Persons of ordinary skill in the art will appreciate that the fan blade 334 can be utilized in a variety of applications, with suitable adaptations and optional features tailored to those applications. It should also be noted that the configuration of the blade 334 illustrated in FIGS. 8A and 8B is shown merely by way of example and not limitation. Other configurations with fewer or greater numbers of depressions 382, different layouts and dimensions, proportions, etc. are possible in further embodiments.

The particular characteristics of the blade 334, such as chord length, radial (i.e., spanwise) dimensions, thickness, twist, camber, sweep, lean, bow, dihedral, etc. can be established as desired for particular applications. For instance, at least some blade characteristics disclosed in PCT patent application PCT/US2015/028733 can be utilized in some embodiments.

As shown in the embodiment of FIGS. 8A and 8B, the array 380 of a plurality of spaced-apart depressions 382 is provided along the pressure side 336 of the blade 334, which helps to reduce a mass of the blade 334. In the illustrated embodiment, the depressions 382 are located only along a portion of the working region 348 of the pressure side 336 of the blade 334, with the blade 334 having a generally smooth suction side, though in alternative embodiments one or more depressions could be located elsewhere on the blade 334 (e.g., on the suction side too). If utilized, suction side depressions can be arranged similarly to those shown on the pressure side 336, or in a different pattern or having different individual depression configurations. The array 380 of the depressions 382 terminates at a radially inward boundary 384 that is spaced from the transition zone 346, such that a portion of the working region 348 is generally smooth and free of the depressions 382. The array 380 can extend all the way to the tip 342 and to each of the leading and trailing edges 338 and 340. In the illustrated embodiment, the array 380 has a substantially linear inner boundary 384, and the array 380 covers approximately 93% of the radial (spanwise) length of the blade 334 and approximately 100% of the chord of the blade 334. The depressions 382 can be omitted from the attachment region 344 and the transition zone 346.

As shown most clearly in FIG. 8B, the depressions 382 in the illustrated embodiment have a shield-like shape. In the illustrated embodiment the shield-like shape has a perimeter that includes a generally convex-flanked apex 382-1 at one end facing the leading edge 338, substantially parallel sides 382-2, and a generally concave-flanked apex 382-3 at another end facing the trailing edge 340. Furthermore, the depressions 382 can each have sidewalls 382-4 arranged substantially orthogonal to a base surface 382-5 (bearing in mind that an aerodynamic shape of the blade 334 will usually not be flat or planar, with the base surfaces 382-5 of the depressions 382 conforming to the overall aerodynamic shape profile of the blade 334), though in alternative embodiments the sidewalls 382-4 can be angled, curved, or have other shape variations in the direction of the thickness of the blade 334. The depressions 382 of the array 380 can be arranged in rows 380-1 and 380-2. As most clearly shown in FIG. 8A, the rows 380-1 and 380-2 of depressions 382 can extend in the radial (i.e., spanwise) direction, with adjacent rows 380-1 and 38-2 offset (in the spanwise direction) and overlapping (in the chordwise direction) to provide a relatively dense pattern in the array 380. Each row 380-1 or 380-2 can extend substantially linearly in the radial (spanwise) direction, or alternatively can be curvilinear to track a swept or otherwise nonlinear shape of the leading and/or trailing edges 338 and/or 340. The concave and convex ends of the shield-like depressions 382 at the opposing apexes 382-1 and 382-3 can have complementary shapes, to facilitate nesting and overlap. A spacing S can be provided between adjacent depressions 382. The spacing S can be substantially uniform, or alternatively can vary.

The depressions 382 each have a height H (measured between apexes 382-1 and 382-3 at opposite ends), a width W (measured perpendicular to the height H at the widest point, such as between the sides 382-2), and a depth D (measured in a direction of a thickness T of the blade 334). The thickness T of the blade 334 is a nominal distance between opposite pressure 336 and suction sides at a given location away from any of the depressions 382. The spacing S can be less than, equal to or greater than the depth D in various embodiments.

The depressions 382 can be oriented at an angle $\alpha$ in relation to a flow direction 386 of fluid passing along the blade 334 during operation. For instance, in the illustrated embodiment, all of the depressions 382 (as measured in relation to a projected line 388 connecting the apexes 382-1 and 382-3) are substantially aligned with the flow direction, such that $\alpha=0$ (merely for illustrative purposes, the angle $\alpha$ is depicted as being non-zero in FIG. 8B). In further embodiments, the orientation angle $\alpha$ can be greater than zero, and can approach 90°. In further alternate embodiments, the depressions 382 in the array 380 can have non-uniform orientation angles $\alpha$, or sub-arrays have different angles $\alpha$ can be provided.

In one embodiment, each of the depressions 382 have the same shape, height H and width W, except for depressions 382' at a perimeter of the blade working area 348 where the depressions 382' can be truncated or otherwise modified to fit on the blade surface (e.g., pressure surface 336). Moreover, as noted above, the array 380 can terminate at boundary 384, and truncated depressions 382' can be located adjacent to the boundary 384. A solid ridge 390 that has at least the thickness T can be provided along some or all of the leading edge 338, trailing edge 340 and/or tip 342 of the blade 334, with the solid ridge 390 interrupting the depressions 382' at those locations. In further embodiments, depressions can be omitted in certain locations, for instance, at or near the solid ridge 390 at the leading edge 338, trailing edge 340 and/or tip 342 of the blade 334 where space would not permit a sufficiently-sized (of full-sized) depression 382 to exist in accordance with a regular depression pattern of the array 380.

The depth D of the depressions 382 and 382' can vary along a gradient G, which can be arranged in a generally radial (spanwise) direction (see FIG. 8A), with shallower depths near the tip 342 and greater depths near the boundary 384, the transition zone 346 and the attachment region 344. The gradient G can have a constant or varying rate of change, and, if varying, can be monotonic or non-monotonic.

In one embodiment, the gradient G can be a substantially continuous depth variation such that the depth D of a given depression 382 or 382' varies (e.g., between opposite sides 382-2) and the depth D also varies between adjacent depressions 382 or 382' of the array 380. In an alternative embodiment, the gradient G can be implemented in a step-wise (i.e., incremental) manner, such that the depths D of adjacent depressions 382 or 382' of the array 380 vary from one another but the depth D within a given depression 382 or 382' is substantially constant. In still further embodiments, the gradient G can be implemented in sub-arrays (i.e., groups) of depressions 382 and 382', each having a plurality of depressions or rows of depressions 382 and 382', with the depth D varying between sub-arrays (groups) and remaining substantially constant within each sub-array (group). The gradient G can be generally uniform in the chordwise direction, that is, the depth D of the depressions can be substantially uniform along the chord of the blade 334 at any given radial (spanwise) location, or can alternatively also vary in the chordwise direction in addition to the radial (spanwise) direction. In some embodiments, the gradient G can vary proportionally to blade thickness T, such that the depth D of the depressions remains at a substantially constant percentage of the blade thickness T throughout some or all of the array 380. Moreover, it should be noted that three or more (e.g., a dozen or more) different depths D can be present in the array 380 on a given surface of the blade, though the precise number of different depths D can be selected as desired for particular applications.

In one embodiment, the shield-like depressions 382 can each have height H of approximately 10% or more (e.g., approximately 20 mm) of an overall blade working area chord length (e.g., approximately 200 mm), a width W of approximately 3.7% (e.g., approx. 11 mm) of an overall radial (spanwise) blade working area length (e.g., approximately 300 mm), a depth D of up to 80% of blade thickness T (in a preferred embodiment, approximately 50% of the blade thickness T, and in further embodiments more than 50%) such as approximately 1-3 mm depth D for a thickness T of 2-6 mm, and the spacing S between adjacent depressions can be approximately 50-150% of the blade thickness T and/or approximately 0.015% of the overall blade working area chord length and/or approximately 0.01% of the overall radial (spanwise) blade working area length (e.g., approximately 3 mm). Furthermore, each (full sized) shield-like depression 382 can occupy an area of approximately 0.3% of an overall surface area of the working area 348 (or alternatively of the array 380), with approximately 85% of the blade surface (e.g., pressure side surface 336) occupied by depressions 382 and 382' and the remaining 15% of the surface area of the working area 348 located outside of any depressions. There can be, for instance, approximately 250 or more depressions 382 and 382' on a given blade surface in some embodiments, such as up to approximately 1000 depressions 382 and 382'.

In general, the one or more depressions 382 and 382' of the fan blade 334 help provide a relatively low mass blade 334 that maintains sufficient strength, stiffness and aerodynamic characteristics. The fan blade 334 can also help provide for relatively low-noise operation, by helping to attenuate eddies as fluid passes the trailing edge 340 of the blade 334 during operation. Individual depressions 382 can have a variety of shapes that provide desired mass reduction without compromising structural support, as explained further below. The depressions 382 can be designed and oriented to provide a benefit to the fluid flow over the blade, or can be designed to have neutral to minimal negative impact on airflow characteristics. If utilized in conjunction with any of the flow modification features described above, the depressions 382 can be locally interrupted by the flow modification features as desired for particular applications.

Figure 9A:
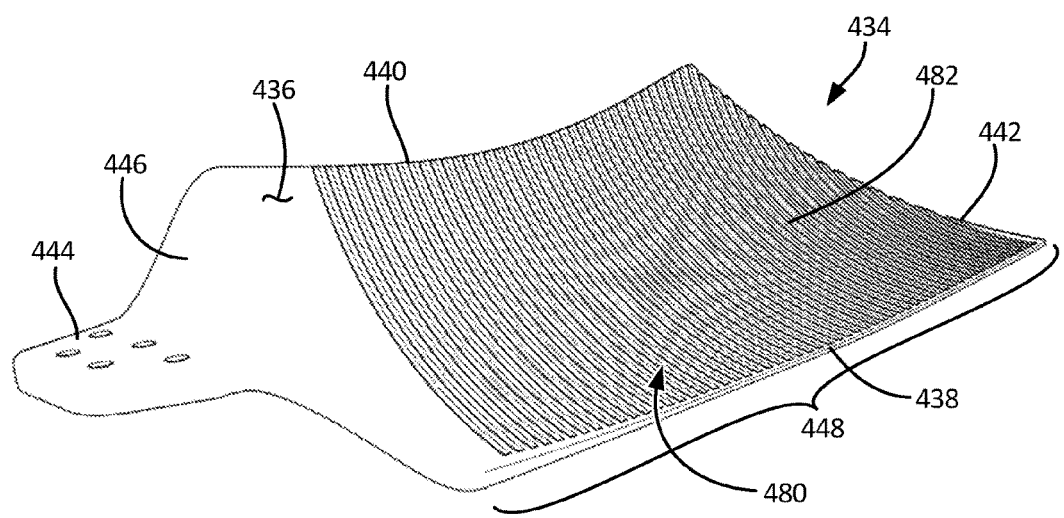
FIG. 9A is a perspective view of another embodiment of a fan blade according to the present invention, shown from a pressure side.
Figure 9B:
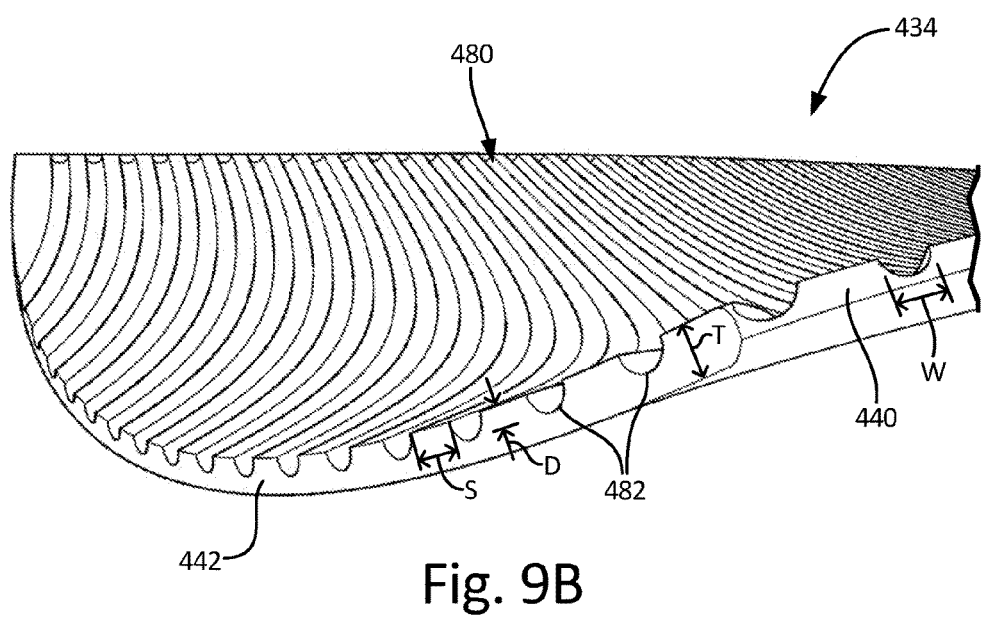
FIG. 9B is an enlarged perspective view of the fan blade of FIG. 9A.

FIGS. 9A and 9B illustrate another embodiment of a fan blade 434. The blade 434 can function generally similar to the blades 34, 134, 234 and 334 described above, with additional or alternative mass-reduction and/or flow modification features described further below. The fan blade 434 includes a pressure side 436, a leading edge 438, a trailing edge 440, a tip 442, attachment portion 444, a transition zone 446, a working region 448, and a suction side (not visible). Further, the fan blade 434 of the illustrated embodiment includes an array 480 of depressions 482 that locally reduce a nominal thickness of the fan blade 434. The fan blade 434 is suitable for use with the fan 30 described above. In alternative embodiments, the fan blade 434 can be used with a different type of fan, such as a non-modular, one-piece molded fan. An outer ring or shroud connecting blades of the fan assembly can optionally be provided in some embodiments. These example applications are provided merely by way of example and not limitation. Persons of ordinary skill in the art will appreciate that the fan blade 434 can be utilized in a variety of applications, with suitable adaptations and optional features tailored to those applications. It should also be noted that the configuration of the blade 434 illustrated in FIGS. 9A and 9B is shown merely by way of example and not limitation. Other configurations with fewer or greater numbers of depressions 482, different layouts and dimensions, proportions, etc. are possible in further embodiments.

The particular characteristics of the blade 434, such as chord length, radial (i.e., spanwise) dimensions, thickness, twist, camber, sweep, lean, bow, dihedral, etc. can be established as desired for particular applications. For instance, at least some blade characteristics disclosed in PCT patent application PCT/US2015/028733 can be utilized in some embodiments.

The fan blade 434 shown in FIGS. 9A and 9B can be generally similar to that of the previously described embodiments, except that depressions 482 have a groove-like (or channel-like) configuration. The groove-like depressions (or grooves) 482 can be located only on the pressure side 436 of the blade 434, or alternatively also in additional locations on the blade 343, such as on the suction side. The groove-like depressions 482 can be elongated and arranged to extend in generally the chordwise and/or flow direction. Although the groove-like depressions 482 are illustrated as being continuous, in further embodiments the depressions 482 can be interrupted or otherwise non-continuous.

At least some of the groove-like depressions 482 can be angled or curved toward the tip 442, at least near or proximate the trailing edge 440, to help direct fluid passing generally in the chordwise direction (between the leading and trailing edges 436 and 440) into a more radially (spanwise) outward direction. Discharging fluid off the tip 442 of the blade 434 on the pressure side 436 in this manner creates a shorter fluid flow path on the pressure side 436 than on the suction side and thereby enhances a pressure differential of the blade 434 for better performance at higher system restriction of operation. In some embodiments, flow modifying aspects of the groove-like depressions 482 can incorporate aspects of the flow modification features 150-1 to 150-4, such as to provide turning of fluid flow. The depressions 482 at the tip 442 can be "open" (see FIG. 9B) along the tip 442 and/or the trailing edge 440 to help discharge fluid. Some depressions 482 can terminate short of the trailing edge 440, such as near the transition zone 446 and attachment region 444. A solid ridge 490 can be provided along at least portions of the leading edge 438, the trailing edge 440 and/or the tip 442 of the blade 434, with the solid ridge 490 interrupting depressions 482 at those locations. In the illustrated embodiment of FIGS. 9A and 9B, the ridge 490 is present along substantially the entire leading edge 438 and along a forward portion of the tip 442, but there is no ridge along the trailing edge 440.

The array 480 of the depressions 482 can be spaced from the transition zone 446, such that a portion of the working region 448 is generally smooth and free of the depressions 482. The array 480 can extend all the way to the tip 442 and to each of the leading and trailing edges 438 and 440. A radially inner boundary of the array 480 can be curved or otherwise non-linear. In the illustrated embodiment, the array 480 covers approximately 93% of the radial (spanwise) length of the blade 434 at the leading edge 438 and approximately 80% of the radial (spanwise) length of the blade 434 at the trailing edge 440, and approximately 100% of the chord of the blade 434. The depressions 482 can be omitted from the attachment region 444 and the transition zone 446.

In one embodiment, the groove-like depressions 482 can each have a width W approximately equal to a blade thickness T (e.g., approximately 2-6 mm), a depth D of up to 80% of the blade thickness T (in a preferred embodiment, depth D can be approximately 50% of the blade thickness T or in further embodiments more than 50%) such as approximately 1-3 mm depth D for thickness T of 2-6 mm, and spacing S (e.g., approximately 2-6 mm) between adjacent depressions 482 of approximately 33-300% of the blade thickness T and/or approximately 0.01-0.03% of an overall blade working area chord length and/or approximately 0.0067-0.02% of an overall radial (spanwise) blade working area length. The width W of the groove-like depressions 482 can be uniform for all depressions, or can vary. The depth D can be uniform, or can vary, such as with a gradient G like that described above with respect to depressions 382. A length (or height) of the groove-like depressions can vary, for instance, the groove-like depressions 382 closest to the tip 442 at the leading edge 438 can be shorter in length than the groove-like depressions 482 closest to the transition zone 446 and the attachment region 444. There can be approximately 85% of the blade surface (e.g., pressure side surface 436) occupied by depressions 482 with the remaining 15% of the blade surface located outside of any depressions 482. The spacing S can be less than, equal to or greater than the depth D in various embodiments. The spacing S can be substantially uniform, or alternatively can vary.

It should be noted that the configuration of the blade 434 illustrated in FIGS. 9A and 9B is shown merely by way of example and not limitation. Other configurations with fewer or greater numbers of depressions 482, different layouts and dimensions, proportions, etc. are possible in further embodiments.

Figure 10A:
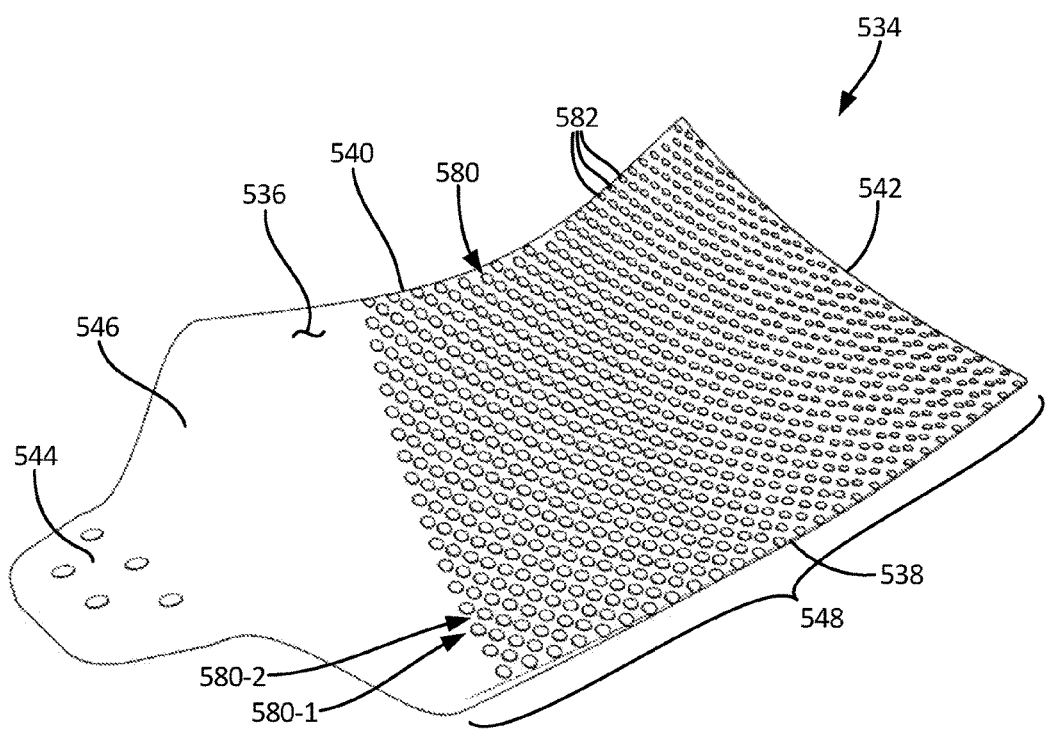
FIG. 10A is a perspective view of another embodiment of a fan blade according to the present invention, shown from a pressure side.
Figure 10B:
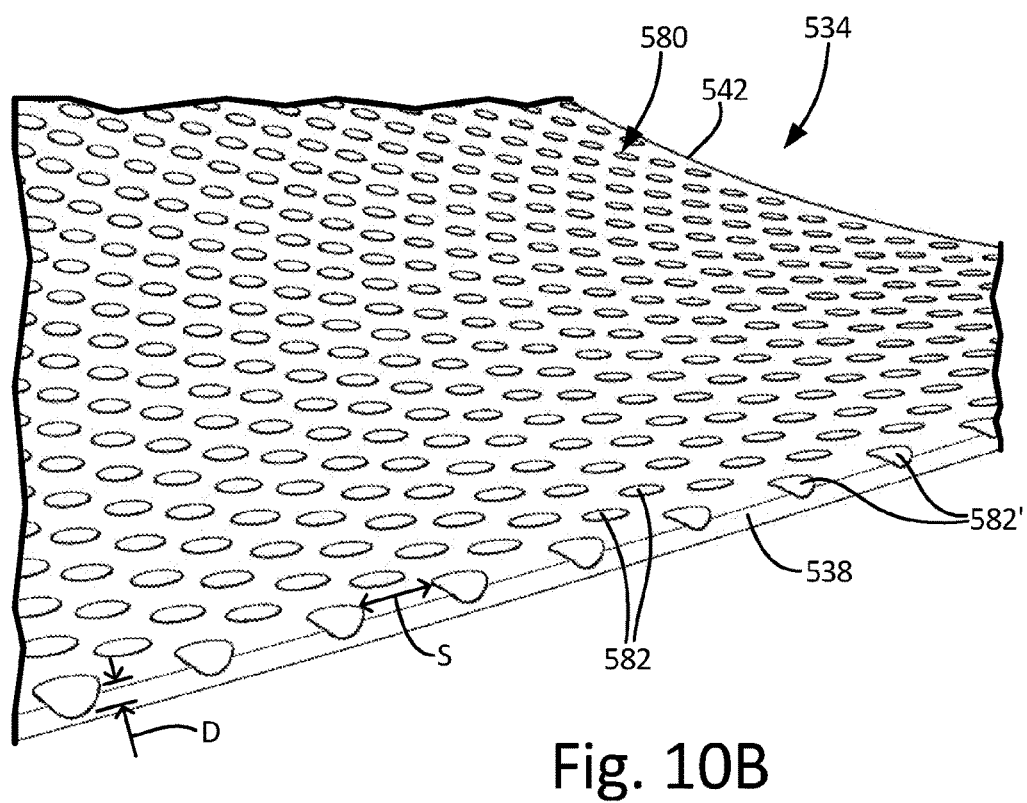
FIG. 10B is an enlarged perspective view of the fan blade of FIG. 10A.

FIGS. 10A and 10B illustrate yet another embodiment of a fan blade 534. The blade 534 can function generally similar to the blades 34, 134, 234, 334 and 434 described above, with additional or alternative mass-reduction features described further below. The fan blade 534 includes a pressure side 536, a leading edge 538, a trailing edge 540, a tip 542, attachment portion 544, a transition zone 546, a working region 548, and a suction side (not visible). Further, the fan blade 534 of the illustrated embodiment includes an array 580 of depressions 582 that locally reduce a nominal thickness of the fan blade 534. The fan blade 534 is suitable for use with the fan 30 described above. In alternative embodiments, the fan blade 534 can be used with a different type of fan, such as a non-modular, one-piece molded fan. An outer ring or shroud connecting blades of the fan assembly can optionally be provided in some embodiments. These example applications are provided merely by way of example and not limitation. Persons of ordinary skill in the art will appreciate that the fan blade 534 can be utilized in a variety of applications, with suitable adaptations and optional features tailored to those applications. It should also be noted that the configuration of the blade 534 illustrated in FIGS. 10A and 10B is shown merely by way of example and not limitation. Other configurations with fewer or greater numbers of depressions 582, different layouts and dimensions, proportions, etc. are possible in further embodiments.

The particular characteristics of the blade 534, such as chord length, radial (i.e., spanwise) dimensions, thickness, twist, camber, sweep, lean, bow, dihedral, etc. can be established as desired for particular applications. For instance, at least some blade characteristics disclosed in PCT patent application PCT/US2015/028733 can be utilized in some embodiments.

The fan blade 534 shown in FIGS. 10A and 10B is generally similar to those of the previously described embodiments, except that the depressions 582 have a dimple-like configuration. The dimple-like depressions 582 can be located only on the pressure side 536 of the fan blade 534, or alternatively also in additional locations on the blade, such as on the suction side.

In the illustrated embodiment, the dimple-like depressions 582 are partially spherical, that is, the dimple-like depressions 582 are spherical segments that conform to a portion of a spherical surface yet open along the surface of the blade 534 so as to constitute less than a complete sphere. The depressions 582 of the array 580 can be arranged in rows 580-1 and 580-2. As most clearly shown in FIG. 10B, adjacent rows 580-1 and 580-2 of depressions 382 can be offset relative to each other to provide an overlapping and therefore denser pattern of the array 580. Each row 580-1 or 580-2 can extend substantially linearly in the radial (spanwise) direction, or alternatively can be curvilinear to track a swept or otherwise nonlinear shape of the leading and/or trailing edges 538 and/or 540.

The array 580 of the depressions 582 can be spaced from the transition zone 546, such that a portion of the working region 548 is generally smooth and free of the depressions 582. The array 580 can extend all the way to the tip 542 and to each of the leading and trailing edges 538 and 540. A radially inner boundary of the array 580 can be curved or otherwise non-linear. In the illustrated embodiment, the array 580 covers approximately 93% of the radial (spanwise) length of the blade 534 at the leading edge 538 and approximately 66% of the radial (spanwise) length of the blade 534 at the trailing edge 540, and approximately 100% of the chord of the blade 534. The depressions 582 can be omitted from the attachment region 544 and the transition zone 546.

In one embodiment, the dimple-like depressions 582 can each have diameters approximately equal to the blade thickness T (e.g., of approximately 2-6 mm), a depth D of up to 80% of a blade thickness T (in a preferred embodiment, the depth D is approximately 50% of the blade thickness T or in further embodiments more than 50%) such as a depth D of approximately 1-3 mm of blade thickness T of 2-6 mm, and a spacing S (e.g., approximately 2-6 mm) between depressions of approximately 33-300% of the blade thickness T and/or approximately 0.01-0.03% of an overall blade working area blade chord length and/or approximately 0.0067-0.02% of an overall radial (spanwise) blade working area length. There can be approximately 85% of the blade surface (e.g., pressure side surface) occupied by depressions with the remaining 15% of the working area blade surface located outside of any depressions 582. The spacing S can be less than, equal to or greater than the depth D in various embodiments. The spacing S can be substantially uniform, or alternatively can vary.

It should be noted that the configuration of the blade 534 illustrated in FIGS. 10A and 10B is shown merely by way of example and not limitation. Other configurations with fewer or greater numbers of depressions 582, different layouts and dimensions, proportions, etc. are possible in further embodiments.

Figure 11:
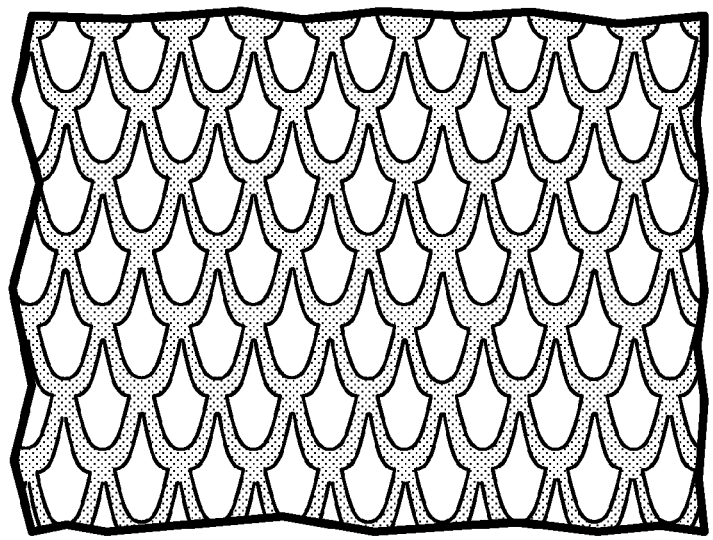
FIGS. 11-16 are elevation views of embodiments of depression arrays for use with further embodiments of a fan blade according to the present invention.
Figure 12:
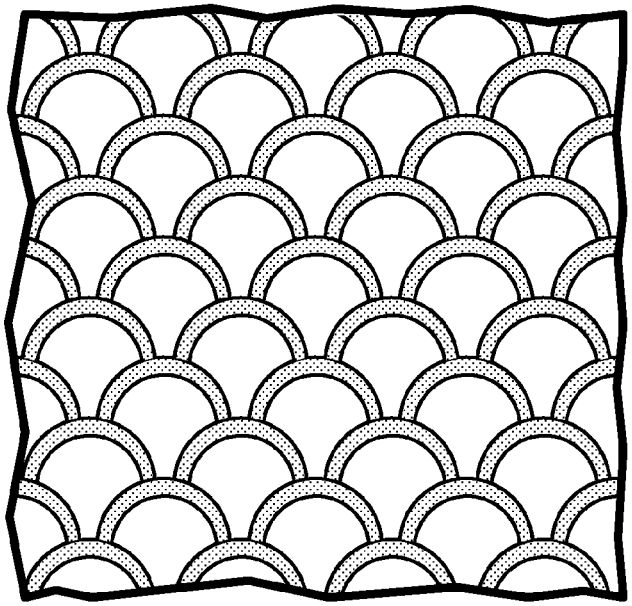
Figure 13:
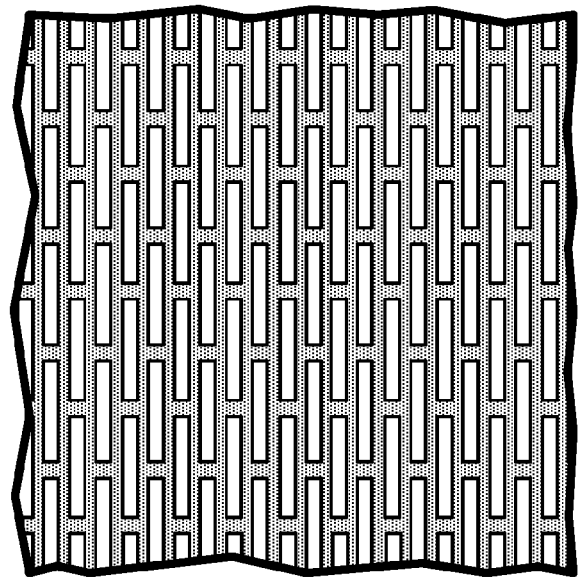
Figure 14:
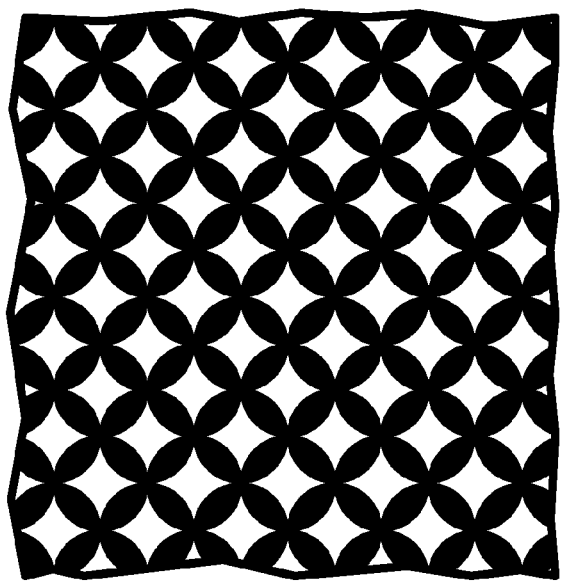
Figure 15:
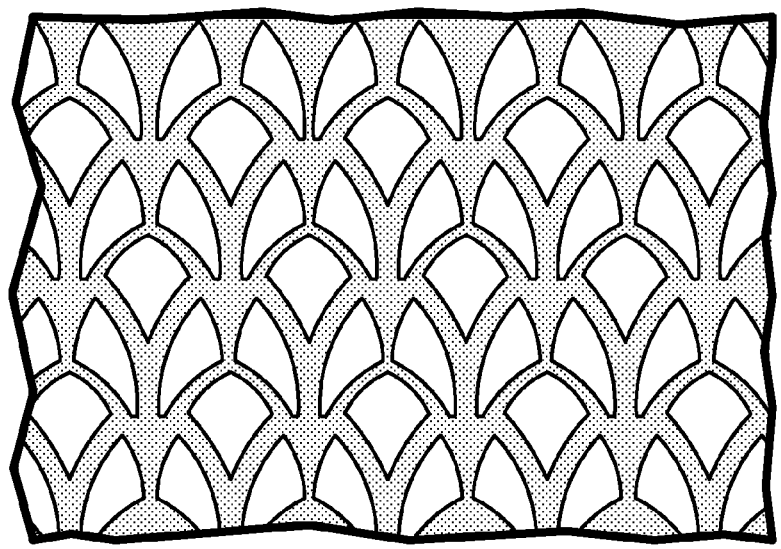
Figure 16:
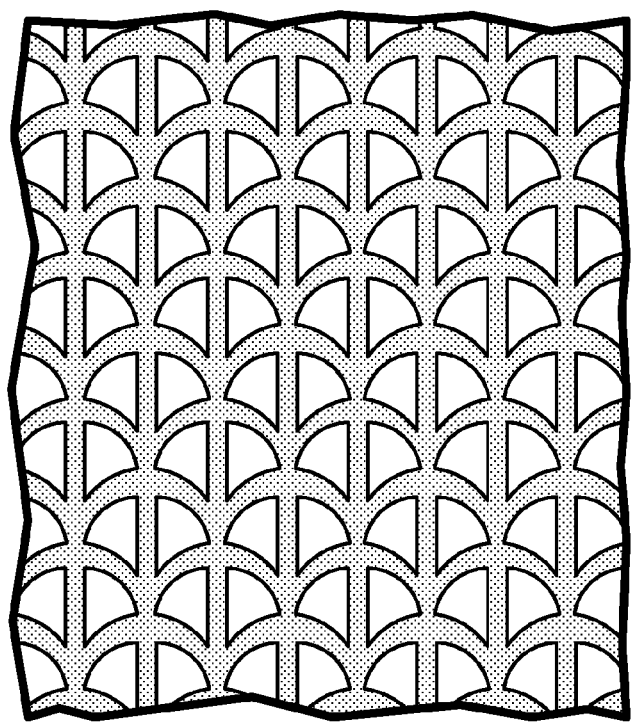

A variety of further depression configurations can be utilized according to the present invention. For instance, FIGS. 11-16 are views of further embodiments of arrays of depressions for use with a fan blade 34, 134, 234, 334, 434 or 534 according to the present invention. For ease of viewing, arears surrounding individual depressions are stippled in FIGS. 11-16. FIG. 11 illustrates an embodiment of a scale-like (e.g., fish-scale-like) depression array. FIG. 12 illustrates a drop-like depression array. FIG. 13 illustrates an embodiment of an oval-like depression array, with the depressions being elongate and nearly rectangular shapes (like a racetrack shape) arranged in a subway-tile pattern. FIG. 14 illustrates an embodiment of a star-like depression array, with the depressions having a regular, four-point star shape with concave apexes. FIG. 15 illustrates an embodiment of a cathedral-like depression array, with the depressions having three non-uniform shapes such that the spaces between depressions resemble flying buttresses of a cathedral. FIG. 16 illustrates an embodiment of a crossbow-like depression array, with the depressions having non-uniform but symmetrical shapes such that the spaces between depressions form a repeating pattern with a curved (bow-like) segment with an intersecting (e.g., bisecting) linear segment.

Yet again, it should be noted that the configurations of the depressions illustrated in FIGS. 11-16 are shown merely by way of example and not limitation. Other configurations with different shapes, layouts and dimensions, proportions, etc. are possible in further embodiments.

Features of any disclosed embodiment can be combined with features of another disclosed embodiment, as desired for particular applications. For instance, an array (or sub-array) of mass-reduction depressions of a first shape and/or arrangement can be combined with another array (or sub-array) of mass-reduction depressions of a second shape and/or arrangement.

The embodiments of the blades 34, 134, 234, 334, 434 and 534 described above can be made using a variety of molding methods. In one embodiment, a conventional molding process can be used. In another embodiment, fiber-reinforced sheet molding compound (SMC) material can be used as disclosed in commonly-assigned PCT Patent App. Pub. No. WO2015/171446. Reinforced or unreinforced molding methods can each produce composite blades as single, monolithic structures. In yet another embodiment, a new "hybrid" molding process, as described in commonly-assigned U.S. Provisional Pat. App. Ser. No. 62/210,168 filed Aug. 26, 2015, can be utilized that exists in between (but differs from) traditional resin transfer molding (RTM) methods for solid carbon fiber composites and traditional high speed injection molding processes for nylon. In such an embodiment, a fan blade 34, 134, 234, 334, 434 or 534 of the present invention can have a "hybrid" multi-layer construction, with a continuous strand reinforced composite layer and an overmolded layer of short-strand (e.g., chopped) fiber reinforced composite material.

Figure 17:
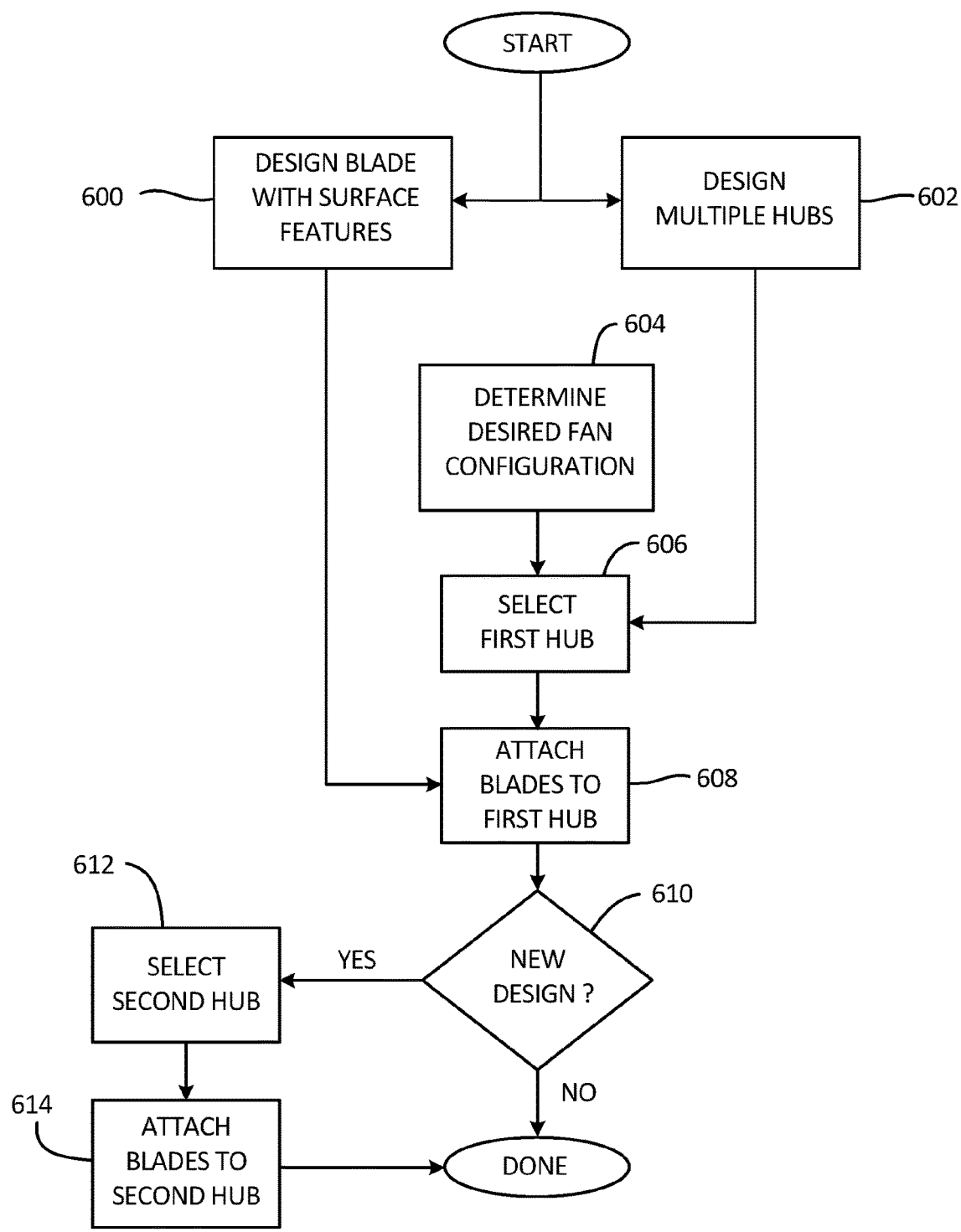
FIG. 17 is a flow chart of an embodiment of a method of designing and making fans according to the present invention.

FIG. 17 is a flow chart of an embodiment of a method of designing and making fans 30, such as axial-flow fans for automotive applications. The method can include designing a blade (34, 134, 234, 334, 434, 534, etc.) with surface features, such as flow modifying features (150-1 to 150-4, 160-1 to 160-3, 270-1 to 270-2, etc.) or an array of depressions (380, 480, 580, etc.) (step 600), and designing multiple fan center hubs 32 (step 602). The blade design can be limited to designing only a single blade that is utilized to make any number of substantially identical blades. In alternative embodiments, only a single hub can be designed. Blade surface features can be designed through the use of computer simulation, rapid prototyping, and/or physical confirmation testing.

A desired fan configuration is also determined (step 604), which can include identifying a desired fan diameter, solidity, and/or other factors. Once a desired fan configuration is determined, a first center hub is selected from available hub designs (step 606) and blades according to the blade design are attached to the selected first center hub (step 608). Depending on the desired fan diameter, the number of blades will vary. For instance, with smaller center hubs a smaller number of blades can be used, and with larger center hubs a larger number of blades can be used (depending upon desired solidity).

If a new fan design is desired (step 610), a second hub design (different from the first hub design) can be selected (step 612) and the blades (having the same design and configuration as used with the first center hub) can be attached to the second hub (step 614).

These assembled fan(s) can then be used in suitable applications, such as for automotive cooling applications. However, the use of different hubs allows overall fan characteristics to be varied without trimming the fan blades, thereby destroying surface features on the trimmed fan blades.

Discussion of Disclosed Embodiments

The following are non-exclusive descriptions of possible embodiments of the present invention.

A fan blade can include a working region having a leading edge, a trailing edge, a pressure side, a suction side and a tip; and a plurality of flow modification features positioned at the working region, the plurality of flow modification features including a first flow modification feature having a wedge shape with a pointed end and a wider end, and located on the pressure side, wherein a length of the first flow modification feature is less than a chord length of the fan blade, and wherein the pointed end of the first flow modification feature is spaced from the leading edge; and a second flow modification feature having a wedge shape with a pointed end and a wider end, and located on the pressure side, wherein a length of the second flow modification feature is less than the chord length of the fan blade, wherein the pointed end of the second flow modification feature is spaced from the leading edge, and wherein the first and second flow modification features are spaced from each other to define a channel therebetween.

The fan blade of the preceding paragraph can optionally include, additionally and/or alternatively, any one or more of the following features, configurations and/or additional components:

the first flow modification feature can be curved such that the pointed end is located radially inward from the wider end;

the second flow modification feature can be curved such that the pointed end is located radially inward from the wider end, and the channel between the first and second flow modification features can be curved;

the first and second flow modification features can each protrude approximately 1-3 mm from the pressure side;

the pointed end of the first flow modification feature can be located at approximately 11% or more of the chord length from the leading edge and at approximately 30% of a radial length of the working region from the tip, and the wider end of the first flow modification feature can be located at the tip in the radial direction;

the pointed end of the second flow modification feature can be located at approximately 45% of the chord length from the leading edge and at approximately 34% of the radial length of the working region from the tip, and the wider end of the second flow modification feature can be located at the tip in the radial direction;

a third wedge-shaped flow modification feature having a wedge shape with a pointed end and a wider end, and located on the pressure side, wherein a length of the third flow modification feature is less than the chord length of the fan blade, wherein the pointed end of the third flow modification feature is spaced from the leading edge, wherein the first, second and third wedge-shaped flow modification features are spaced from each other;

the length of the third wedge-shaped flow modification feature can be shorter than the length of each of the first and second flow modification features;

the pointed end of the third flow modification feature can be located at approximately 76% of the chord length from the leading edge and at approximately 33% of the radial length of the working region from the tip, and the wider end of the second flow modification feature can be located at the trailing edge;

a midpoint of the wider end of the third flow modification feature can be located at approximately 28% of the radial length of the fan blade from the tip;

the wider end of the third flow modification feature can be aligned with the trailing edge and spaced from the tip;

the first and second flow modification features can both be located entirely within a radially outer half of the working region;

the wider ends of the first and second flow modification features can both be aligned with the tip;

the wider end of the second flow modification feature can extend to the trailing edge;

a transition zone located adjacent to the working region; and an attachment portion located adjacent to the transition zone opposite the working region, wherein the attachment portion includes a plurality of holes to accept fasteners for attachment to a hub;

a plurality of additional flow modification features having a wedge shape with a pointed end and a wider end, and located on the suction side, wherein a length of each of the additional flow modification features is less than the chord length of the fan blade, and wherein the pointed ends of the additional flow modification features are spaced from the leading edge; and/or at least one of the plurality of additional flow modification features can be curved such that the pointed end is located radially outward from the wider end.

A method of axial-flow fan operation can include rotating a fan blade; passing fluid along a pressure side of the fan blade from a leading edge toward a trailing edge; and redirecting the fluid passing along the pressure side into a more radially outward direction through a first curved channel defined between flow modification structures projecting from the pressure side of the fan blade, wherein the first curved channel begins at a mid-chord and mid-span location along the pressure side and extends to a tip of the fan blade.

The method of the preceding paragraph can optionally include, additionally and/or alternatively, any one or more of the following steps, features, and/or configurations:

redirecting the fluid passing along the pressure side in a more radially outward direction through a second curved channel defined between flow modification structures projecting from the pressure side of the fan blade, wherein the first curved channel is spaced from the second curved channel;

the fluid redirected through the first channel can be ejected off the tip of the fan blade aft of a location of a stationary fan shroud positioned adjacent to the tip;

a direction of flow of the fluid along the pressure side of the fan blade can be unconstrained upstream of the first curved channel; and/or passing the fluid along a suction side of the fan blade from the leading edge toward the trailing edge; and redirecting the fluid passing along the suction side into a more radially inward direction through an additional curved channel defined between additional flow modification structures projecting from the suction side of the fan blade, wherein the additional curved channel begins at a mid-chord and mid-span location along the suction side.

A fan blade can include: a working region having a leading edge, a trailing edge, a pressure side, a suction side and a tip, wherein the working region has a thickness measured between the pressure side and the suction side; and an array of depressions on the pressure side, wherein each of the depressions in the array has a depth that locally reduces a thickness of the fan blade by at least 50%.

The fan blade of the preceding paragraph can optionally include, additionally and/or alternatively, any one or more of the following features, configurations and/or additional components:

the array of depressions can be arranged in rows, and adjacent rows of the array can be radially offset and overlap in a chordwise direction;

the rows of the array can be substantially linear;

the array of depressions can cover approximately 85% of the working region on the pressure side, and a remaining portion of the working region can be free of depressions;

the depressions can have a depth of approximately 50-80% of the thickness of the fan blade;

the depressions can have a depth of approximately 80% of the thickness of the fan blade;

the fan blade can be constructed as a single monolithic structure from a composite material;

the depressions of the array can be spaced from each other by a distance that is approximately 33-300% of the thickness of the fan blade;

the depressions of the array can be spaced from each other by a distance that is greater than the depth of the depressions;

at least one of the depressions of the array adjoining at least one of the leading edge, the trailing edge and the tip can be truncated;

the depressions of the array can each have a shield-shaped perimeter;

the shield-shaped perimeter can have a concave-flanked apex at one end and a convex-flanked apex at another end;

the depressions of the array can be arranged at an angle that is substantially aligned with a direction of fluid flow along the pressure side;

the depressions of the array can be configured as semi-spherical dimples;

the depressions of the array can be configured as elongate grooves;

the grooves can curve radially outward proximate the trailing edge;

the depressions of the array can be configured with a perimeter shape selected from the group consisting of: a scale shape, a droplet shape, a racetrack shape, and a star shape;

the depressions of the array can form a pattern of three non-uniform shapes such that spaces between adjacent depressions resemble flying buttresses of a cathedral;

the depressions of the array can form a pattern of two non-uniform but symmetrical crossbow-like shapes such that spaces between adjacent depressions form a repeating pattern with a curved segment with bisecting segment;

a transition zone located adjacent to the working region; and an attachment portion located adjacent to the transition zone opposite the working region;

the array of depressions can be spaced from transition zone, such that a portion of the working region is free of depressions;

at least one depression at an inner boundary of the array can be truncated; and/or the array of depressions can have an inner boundary that is curved, such that the inner boundary at the trailing edge is located radially outward from the inner boundary at the leading edge.

A fan blade can include: a working region having a leading edge, a trailing edge, a pressure side, a suction side and a tip; and a plurality of flow modification features positioned at the working region, the plurality of flow modification features including a first flow modification feature having a wedge shape with a pointed end and a wider end, and located on the suction side, wherein a length of each of the first flow modification feature is less than the chord length of the fan blade, and wherein the pointed end of the first flow modification feature is spaced from the leading edge; and a second flow modification feature having a wedge shape with a pointed end and a wider end, and located on the suction side, wherein a length of the second flow modification feature is less than the chord length of the fan blade, wherein the pointed end of the second flow modification feature is spaced from the leading edge, and wherein the first and second flow modification features are spaced from each other to define a channel therebetween.

The fan blade of the preceding paragraph can optionally include, additionally and/or alternatively, any one or more of the following features, configurations and/or additional components:

the first flow modification features can be curved such that the pointed end is located radially outward from the wider end; and/or one or more additional flow modification features can be provided on the pressure side.

A method of making axial flow fans can include designing a fan blade according to a first fan blade design; designing a plurality of hubs having different configurations; selecting one of the plurality of hub designs, the selected one of the plurality of hub designs having a first hub design that includes at least one blade surface feature; and attaching a plurality of fan blades having the first fan blade design to a hub having the first hub design.

The method of the preceding paragraph can optionally include, additionally and/or alternatively, any one or more of the following steps, features, and/or configurations:

selecting a second of the plurality of hub designs having a second hub design, wherein the second hub design has a different diameter than the first hub design; and attaching another plurality of fan blades having the first fan blade design to a hub having the second hub design.

A fan blade includes a working region having a leading edge, a trailing edge, a pressure side, a suction side and a tip; and a first flow modification feature that protrudes from the pressure side at the tip, wherein the first flow modification feature is further located at or near the leading edge, and wherein the first flow modification feature has a chordwise length less than a chord length of the fan blade at the tip, and preferably less than approximately two-thirds of the chord length of the fan blade at the tip.

The fan blade of the preceding paragraph can optionally include, additionally and/or alternatively, any one or more of the following features, configurations and/or additional components:

a second flow modification feature that protrudes from the suction side at the tip, wherein a chordwise region occupied by the second flow modification feature is spaced from a chordwise region occupied by the first flow modification feature.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, minor alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the spirit and scope of the claims.

The invention claimed is:

1. A fan blade comprising:
a working region having a leading edge, a trailing edge, a pressure side, a suction side and a tip, wherein the working region has a thickness measured between the pressure side and the suction side; and
an array of depressions on the pressure side, wherein each of the depressions in the array has a depth that locally reduces a thickness of the fan blade by at least 50%, wherein the array of depressions has an inner boundary that is curved, such that the inner boundary at the trailing edge is located radially outward from the inner boundary at the leading edge.

2. The fan blade of claim 1, wherein the array of depressions is arranged in rows, and wherein adjacent rows of the array are radially offset and overlap in a chordwise direction.

3. The fan blade of claim 2, wherein the rows of the array are substantially linear.

4. The fan blade of claim 1, wherein the array of depressions covers approximately 85% of the working region on the pressure side, and wherein a remaining portion of the working region is free of depressions.

5. The fan blade of claim 1, wherein the depressions have a depth of approximately 50-80% of the thickness of the fan blade.

6. The fan blade of claim 1, wherein the depressions have a depth of approximately 80% of the thickness of the fan blade.

7. The fan blade of claim 1, wherein the fan blade is constructed as a single monolithic structure from a composite material.

8. The fan blade of claim 1, wherein the depressions of the array are spaced from each other by a distance that is approximately 33-300% of the thickness of the fan blade.

9. The fan blade of claim 1, wherein the depressions of the array are spaced from each other by a distance that is greater than the depth of the depressions.

10. The fan blade of claim 1, wherein at least one of the depressions of the array adjoining at least one of the leading edge, the trailing edge and the tip is truncated.

11. The fan blade of claim 1, wherein the depressions of the array each have a shield-shaped perimeter.

12. The fan blade of claim 11, wherein the shield-shaped perimeter has a concave-flanked apex at one end and a convex-flanked apex at another end.

13. The fan blade of claim 1, wherein the depressions of the array are arranged at an angle that is substantially aligned with a direction of fluid flow along the pressure side.

14. The fan blade of claim 1, wherein the depressions of the array are configured as semi-spherical dimples.

15. The fan blade of claim 1, wherein the depressions of the array are configured as elongate grooves.

16. The fan blade of claim 15, wherein the grooves curve radially outward proximate the trailing edge.

17. The fan blade of claim 1, wherein the depressions of the array are configured with a perimeter shape selected from the group consisting of: a scale shape, a droplet shape, a racetrack shape, and a star shape.

18. The fan blade of claim 1, wherein the depressions of the array form a pattern of three non-uniform shapes such that spaces between adjacent depressions resemble flying buttresses of a cathedral.

19. The fan blade of claim 1, wherein the depressions of the array form a pattern of two non-uniform but symmetrical crossbow-like shapes such that spaces between adjacent depressions form a repeating pattern with a curved segment with bisecting segment.

20. The fan blade of claim 1 and further comprising:
a transition zone located adjacent to the working region; and
an attachment portion located adjacent to the transition zone opposite the working region.

21. A fan blade comprising:
a working region having a leading edge, a trailing edge, a pressure side, a suction side and a tip, wherein the working region has a thickness measured between the pressure side and the suction side;
a transition zone located adjacent to the working region, wherein the transition zone is twisted;
an attachment portion located adjacent to the transition zone opposite the working region, wherein the attachment portion is substantially planar and includes a plurality of holes to accommodate fasteners; and
an array of depressions on the pressure side of the working region, wherein each of the depressions in the array has a depth that locally reduces a thickness of the fan blade by at least 50%, and wherein the array of depressions is spaced from the transition zone, such that a radially inner portion of the working region is free of depressions.

22. The fan blade of claim 21, wherein at least one depression at an inner boundary of the array is truncated.

23. The fan blade of claim 20, wherein the attachment portion is substantially planar and includes a plurality of holes to accommodate fasteners.

24. A fan blade comprising:
a working region having a leading edge, a trailing edge, a pressure side, a suction side and a tip, wherein the working region has a thickness measured between the pressure side and the suction side;
a transition zone located adjacent to the working region, wherein the transition zone is twisted;
an attachment portion located adjacent to the transition zone opposite the working region; and
an array of depressions on the pressure side of the working region, wherein each of the depressions in the array has a depth that locally reduces a thickness of the fan blade by at least 50%, and wherein the array of depressions is spaced from the transition zone, such that a portion of the working region is free of depressions, and wherein the array of depressions has an inner boundary that is curved.

25. The fan blade of claim 24, wherein the attachment portion is substantially planar and includes a plurality of holes to accommodate fasteners.

* * * * *